(12) United States Patent
Goyal et al.

(10) Patent No.: US 9,338,289 B1
(45) Date of Patent: May 10, 2016

(54) AUTOMATIC DETERMINATION OF CALLER IDENTIFICATION DATA IN OUTGOING CALLS

(71) Applicant: Velocify, Inc., El Segundo, CA (US)

(72) Inventors: Manoj Goyal, Los Angeles, CA (US); Shze Chew Lee, Irvine, CA (US); Nicholas Hedges, Santa Monica, CA (US)

(73) Assignee: Velocify, Inc., El Segundo, CA (US)

( * ) Notice: Subject to any disclaimer, the term of this patent is extended or adjusted under 35 U.S.C. 154(b) by 0 days.

(21) Appl. No.: 14/928,826

(22) Filed: Oct. 30, 2015

Related U.S. Application Data

(60) Provisional application No. 62/185,509, filed on Jun. 26, 2015, provisional application No. 62/208,298, filed on Aug. 21, 2015, provisional application No. 62/239,162, filed on Oct. 8, 2015.

(51) Int. Cl.
| | | |
|---|---|---|
| *H04M 3/42* | (2006.01) | |
| *H04L 29/12* | (2006.01) | |
| *H04M 7/00* | (2006.01) | |
| *H04W 8/18* | (2009.01) | |
| *G06Q 30/02* | (2012.01) | |

(52) U.S. Cl.
CPC ......... *H04M 3/42059* (2013.01); *H04L 61/106* (2013.01); *H04M 3/42348* (2013.01); *H04M 7/0021* (2013.01); *H04W 8/183* (2013.01); *G06Q 30/0267* (2013.01)

(58) Field of Classification Search
None
See application file for complete search history.

(56) References Cited

U.S. PATENT DOCUMENTS

| | | | |
|---|---|---|---|
| 5,430,782 A | 7/1995 | Brady et al. | |
| 5,625,680 A | 4/1997 | Foladare et al. | |
| 5,751,795 A | 5/1998 | Hassler et al. | |
| 6,038,305 A * | 3/2000 | McAllister | H04M 3/38 379/201.02 |
| 6,038,456 A | 3/2000 | Colby et al. | |
| 6,137,870 A | 10/2000 | Scherer | |
| 6,272,126 B1 | 8/2001 | Strauss et al. | |
| 6,310,948 B1 | 10/2001 | Nemeth | |
| 6,324,272 B1 | 11/2001 | Abu-Shukhaidem et al. | |
| 6,330,327 B1 | 12/2001 | Lee et al. | |
| 6,542,591 B1 | 4/2003 | Amro et al. | |
| 6,546,238 B1 | 4/2003 | Nightingale et al. | |
| 6,556,818 B1 | 4/2003 | Meehan | |
| 6,608,892 B2 | 8/2003 | Shaffer et al. | |
| 6,633,633 B1 | 10/2003 | Bedingfield | |

(Continued)

FOREIGN PATENT DOCUMENTS

| | | |
|---|---|---|
| EP | 0944229 A1 | 9/1999 |
| JP | 2004112253 A | 4/2004 |

*Primary Examiner* — Ian N Moore
*Assistant Examiner* — Justin T Van Roie
(74) *Attorney, Agent, or Firm* — Knobbe, Martens, Olson & Bear LLP

(57) ABSTRACT

Automatic determination of caller identification information and encoding of such information in outgoing data requests, such a API calls to a call management component, are disclosed herein. The caller identification information may be determined by analyzing information associated with a call target to determine if the target has a custom outbound telephone number assigned, was contacted through a specific campaign, has local geographic data, is being called from a specific entity, or is being made from a call originator with a specific outbound number set. The system may execute machine learning on previous calling data in order to update caller identification selection models used for other outgoing calls.

5 Claims, 12 Drawing Sheets

(56) References Cited

U.S. PATENT DOCUMENTS

| | | |
|---|---|---|
| 6,650,743 B2 | 11/2003 | Heinmiller et al. |
| 6,700,972 B1 | 3/2004 | McHugh et al. |
| 6,714,535 B1 | 3/2004 | Herh |
| 6,735,292 B1 | 5/2004 | Johnson |
| 6,760,426 B2 | 7/2004 | Sbisa et al. |
| 6,795,530 B1 | 9/2004 | Gilbert et al. |
| 6,798,772 B2 | 9/2004 | Bergman et al. |
| 6,813,344 B1 | 11/2004 | Lemke |
| 6,853,717 B1 | 2/2005 | Frentz et al. |
| 6,870,915 B2 | 3/2005 | Stillman et al. |
| 6,901,266 B2 | 5/2005 | Henderson |
| 6,968,044 B2 | 11/2005 | Beason et al. |
| 6,985,569 B2 | 1/2006 | Baker |
| 7,027,575 B1 | 4/2006 | Burgess |
| 7,065,185 B1 | 6/2006 | Koch |
| 7,103,172 B2 | 9/2006 | Brown et al. |
| 7,298,833 B2 | 11/2007 | Klein et al. |
| 7,330,464 B2 | 2/2008 | Brouwer et al. |
| 7,340,262 B1 | 3/2008 | Gillespie et al. |
| 7,346,156 B1 | 3/2008 | Choupak et al. |
| 7,376,228 B2 | 5/2008 | Haug et al. |
| 7,602,894 B1 | 10/2009 | Shaffer et al. |
| 7,640,009 B2 | 12/2009 | Belkin et al. |
| 7,756,253 B2 | 7/2010 | Breen et al. |
| 7,899,619 B2 | 3/2011 | Petras |
| 7,925,003 B2 | 4/2011 | Haug et al. |
| 8,027,332 B1 | 9/2011 | Martin et al. |
| 8,036,356 B1 * | 10/2011 | Ghosh .................. H04M 1/575 379/114.14 |
| 8,040,875 B2 | 10/2011 | Barclay et al. |
| 8,135,122 B1 | 3/2012 | Siminoff |
| 8,254,550 B1 * | 8/2012 | Serrano ............... H04M 7/0006 379/111 |
| 8,565,399 B2 | 10/2013 | Siminoff |
| 9,264,539 B2 | 2/2016 | Lin |
| 2002/0061100 A1 | 5/2002 | DiCamillo et al. |
| 2002/0181681 A1 | 12/2002 | Mani |
| 2003/0007616 A1 | 1/2003 | Alves et al. |
| 2004/0120477 A1 | 6/2004 | Nguyen et al. |
| 2005/0053213 A1 | 3/2005 | Giannoit |
| 2005/0100049 A1 | 5/2005 | Siminoff |
| 2005/0105705 A1 | 5/2005 | Elcock et al. |
| 2006/0140200 A1 | 6/2006 | Blake et al. |
| 2006/0256957 A1 | 11/2006 | Fain et al. |
| 2007/0127703 A1 | 6/2007 | Siminoff |
| 2007/0160188 A1 | 7/2007 | Sharpe et al. |
| 2008/0008179 A1 * | 1/2008 | Chen .................. H04L 61/2007 370/392 |
| 2011/0032870 A1 * | 2/2011 | Kumar ................. H04W 12/12 370/328 |
| 2014/0369479 A1 | 12/2014 | Siminoff |
| 2016/0021255 A1 | 1/2016 | Weldon |
| 2016/0037129 A1 | 2/2016 | Tangeland et al. |
| 2016/0066365 A1 | 3/2016 | Najafabadi et al. |

* cited by examiner

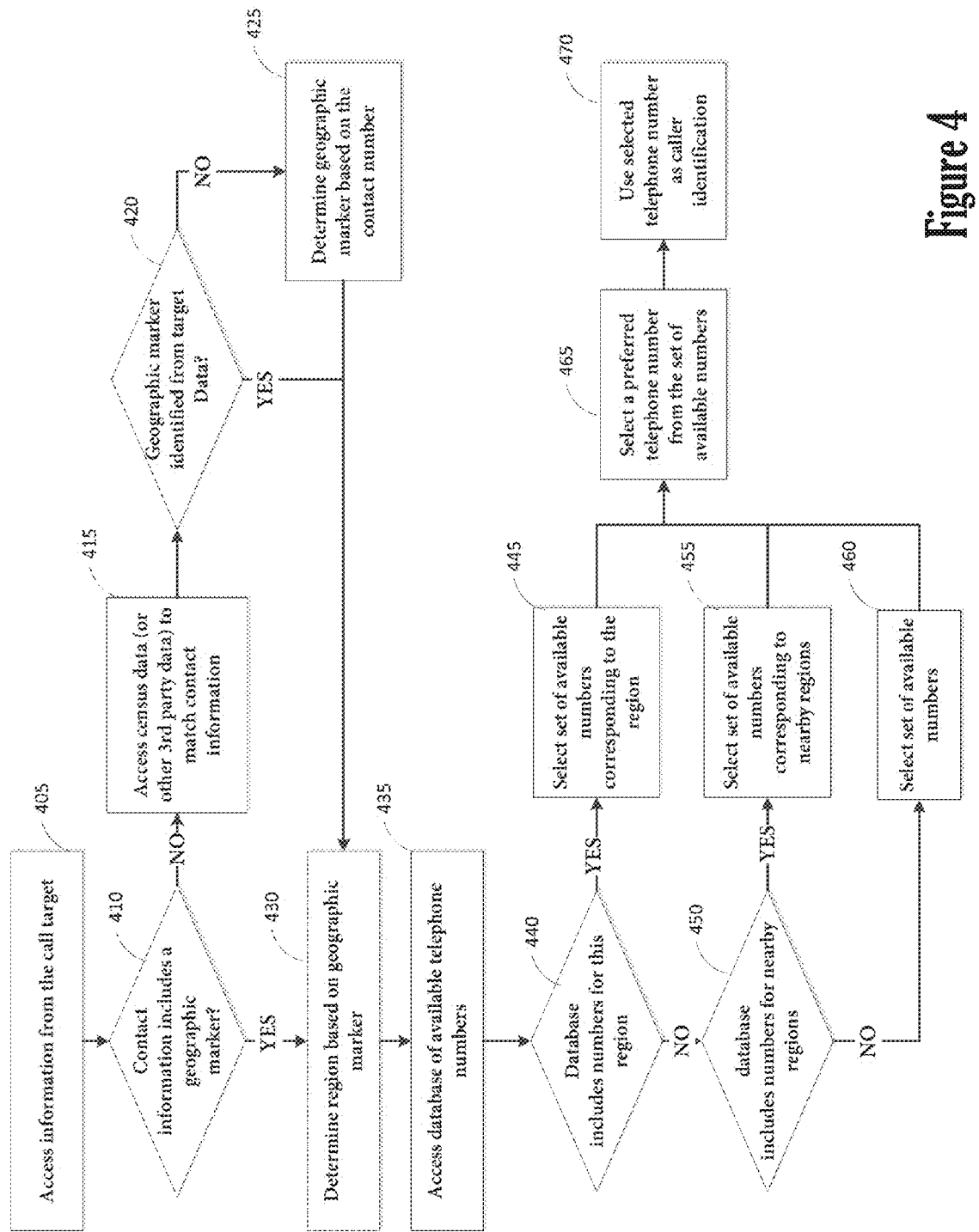

AUTOMATIC DETERMINATION OF CALLER IDENTIFICATION DATA IN OUTGOING CALLS

CROSS-REFERENCE TO RELATED APPLICATIONS

This application claims priority from provisional U.S. Pat. App. No. 62/185,509 filed on Jun. 26, 2015, and provisional U.S. Pat. App. No. 62/208,298 filed on Aug. 21, 2015, and provisional U.S. Pat. App. No. 62/239,162 filed on Oct. 8, 2015 which is hereby incorporated by reference in its entirety.

BACKGROUND

Inclusion of caller ID informant in outgoing telephone calls, whether made to/from an analog, digital, voice-over-IP, or other type of communication device, has become increasingly widespread in view of its ability to provide information to a call recipient that may be useful by the call recipient in determining how to prepare for a particular call prior to answering, or whether to even answer the particular call.

SUMMARY

The systems, methods, and devices described herein each have several aspects, no single one of which is solely responsible for its desirable attributes. Without limiting the scope of this disclosure, several non-limiting features will now be described briefly.

Various embodiments of the present disclosure provide improvements to various communication technologies, such as multi-party telephonic communications. These improvements include, for example, systems and methods for automatically selecting caller ID information, such as by a machine learning algorithm, and transmitting that caller ID information to a call recipient's device in order to increase likelihood of conveying the appropriate message to the recipient via the caller ID information (e.g., to get the recipient to answer the call in many cases). Caller ID information may be stored in databases and indexed for selection by a target management system in real-time for inclusion in an outgoing telephone call. Thus, particular caller ID information may be selected and encoded in a call initiated via a data package sent to a call management component such that it can be decoded by a telephony device, such as a mobile device or voice-over-IP device, for display to the user. Furthermore, processing of audio electrical signals, such as multiple voices on a call, may be performed in order to gain intelligence on attributes of a multi-party call and possibly implement changes to the call, such as adding an additional party to the call or updating a caller ID selection algorithm that may be used in later determinations of caller ID information for similar calls.

Various systems and methods disclosed herein are inextricably tied to computer technology and telephony systems. For example, various embodiments rely on detection of user inputs via user interfaces, real-time access to databases, automatic selection of caller ID information, API calls to call initiation components (e.g., that initiate calls to multiple parties), and/or electronic manipulation of signals across computer and/or telephony systems. Furthermore, initiating telephone connections across phone lines, including voice-over-IP in some embodiments, is intimately tied to, and enabled by, computer technology, and would not exist except for computer technology. For example, selecting an outbound telephone number in real-time (based on various factors, such as those discussed below) and setting caller ID information on an outgoing telephone call, through use of an API and a third-party call generation service in some instances, cannot be performed by humans alone, without the computer and electronic technology upon which they are implemented. Improvements on existing use of caller ID information in telephone calls of all types are disclosed herein. Further, the implementation of the various embodiments of the present disclosure via computer technology enables many of the advantages described herein, including more effective selection of outbound telephone numbers to include in caller ID and customization of processes by which particular callers can program the system to automatically select caller ID information, further optimizing technology associated with a calling system, especially a calling system that handles a high volume of outbound calls where determination of caller ID information can significantly impact efficiency of initiating calls.

In one embodiment, an automated caller identification selection system initiating connections with a multi-party connection interface comprises a target management computing system having one or more hardware computer processors in communication with a non-transitory computer readable medium storing a caller id selection algorithm. In one embodiment, the caller id selection algorithm is executable by the computer processors to execute a prioritization algorithm on a plurality of user records to identifying a particular user record having a current highest priority, determine an IP address associated with the user record, the IP address associated with an electronic device of the user that was used to communicate with an online entity, determine a geographic identifier associated with the IP address, based on the geographic identifier, determine a particular telephone number having a similar geographic identifier in a database of available telephone numbers, and initiate an API call to a call management component, the API call including the particular telephone number and an electronic destination address included in the particular user record. In one embodiment, the call management component comprises a call initiation algorithm configured to transmit an encoded call initiation data sequence to the electronic destination address, the encoded call initiation data sequence including the particular telephone number encoded as caller identification information, and the call initiation data sequence further monitors a connection with the electronic destination address, and when the user responds to the call initiation data sequence, associating the connection with an online multi-party connection interface.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 3B-3D are example interactive user interfaces that may be provided to users of the various systems and methods discussed herein, such as to improve the computer's ability to display information and allow the user to interface with the information.

FIG. 4 depicts a flow diagram illustrating processes for selecting a telephone number based on a call target's geographic data according to some embodiments.

DETAILED DESCRIPTION

Figure 1A:
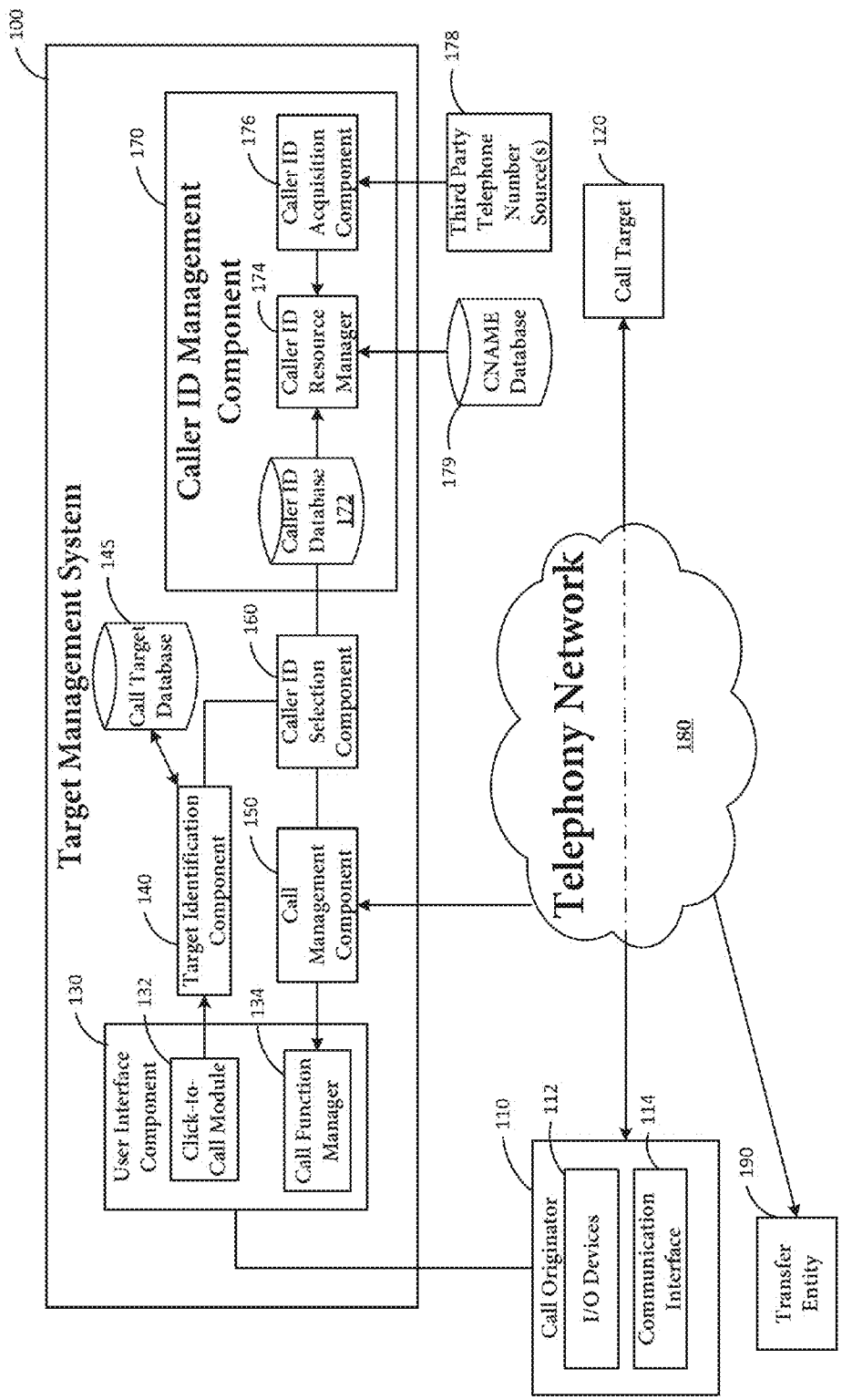
FIGS. 1A, 1B, and 1C are block diagrams of a target management system as implemented in some embodiments.

Although certain particular embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Caller identification information transmitted through phone systems provides a call recipient with information about the individual or entity making a call to the recipient. Some telephone systems, such as PBX (Private Branch Exchange) phone systems, allow for outbound calls made from multiple phones within an organization to utilize the same outbound caller identification information. Other calling systems use predefined or assigned caller ID information for each particular device. For example, a call from a first user's voice-over-IP (VOIP) phone may always user caller ID information 123-456-7890.

DEFINITIONS

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide exemplary definitions.

Database: refers to a database (e.g., RDBMS or SQL database), or may refer to any other data structure, such as, for example a comma separated values (CSV), eXtendible markup language (XML), TeXT (TXT) file, flat file, spreadsheet file, and/or any other widely used or proprietary format.

Caller ID number: a telephone number associated with an outgoing call to a call target. For a particular call, the Caller ID number is transmitted with the outgoing call, such that the call target can determine the Caller ID number and display it on a computer screen or telephone display of the call target. In some embodiments, caller ID numbers are encoded in outgoing data in various manners. For example, a digital call to a call target may encode a caller ID number in a manner different than caller ID numbers are encoded in outgoing analog calls.

CNAM information, CNAM data, or CNAM value: alphanumeric text that is associated with a telephone number, such as the name of an individual or company associated with a Caller ID number. The CNAM information and/or the Caller ID number may be displayed on a phone receiving a call (e.g., a call target, as discussed below). The owner of a telephone number can update the CNAM information associated with the telephone number in one or more CNAM databases that include the CNAM information. For example, an individual or business can purchase telephone numbers and then request (typically with a payment to the CNAM database provider) particular CNAM information be associated with each telephone number. Some telephone numbers may have no CNAM information, while others may have associated CNAM data. For example, an individual that owns a number (e.g., 123-456-7890) may have his name set as the CNAM data (e.g., John Smith) such that when a telephonic device receives a call with that number in the Caller ID number, the device can retrieve from one or more CNAM databases CNAM data indicating the owner's name, and display the CNAM data on the receiving telephonic device.

Caller ID information or Caller IDs: a Caller ID number (e.g., sent with a telephone call) and/or CNAM information (e.g., customizable information associated with a telephone number that is looked up by the call receiver from one or more databases). While a Caller ID number and CNAM data each provide information about an incoming call, they typically are different pieces of information from different sources. Generally, the Caller ID number, e.g., a phone number, of a caller is included in the outgoing call, while the CNAM information is not. Instead, the CNAM information is looked up from one or more databases that store associations between telephone numbers and CNAM information. This lookup of CNAM information may be performed by the phone carrier of the call target (or by a third party service used by the call target) and then the CNAM information may be displayed, alongside the Caller ID number in some cases.

Call Originator: an individual and/or phone system that originates a call to a call target. For example, a call originator may be a voice over IP (VOIP) phone, cell phone, landline phone, or computer executing telephony software. In some embodiments, a computing system (e.g., the target management system discussed below) serves as an intermediary between a call originator and a call target by, for example, initiating a call to the call target and a call to the call originator (possibly after a connection is made with the call target) and connecting the two calls together so that the call target and call originator may communicate with one another via a phone call (e.g., by placing the two calls in a conference room). Thus, in some embodiments, even though a call originator (e.g., an individual and his cell phone) may not dial the number of the call target that the call originator wishes to contact, but instead receives a call from the target management system that connects the cell phone with a call to the call target, that individual and/or his cell phone may still be considered the call originator in this disclosure.

Call Target: an individual and/or phone system that receives a call from a call originator. For example, a call target may be a voice over IP (VOIP) phone, cell phone, landline phone, or computer executing telephony software. As noted above, in some embodiments, a computing system (e.g., the target management system discussed below) serves as an intermediary between a call originator and a call target by, for example, initiating a call to the call target and a call to the call originator and connecting the two calls together so that the call target and call originator may communicate with one another via a phone call.

Transfer Entity: an individual and/or phone system to which an existing call between a call originator and call target is transferred. For example, a transfer entity may receive a call from the target management system and be added to an ongoing call between a call originator and call target (e.g., to create a three-way call) and/or the transfer entity may replace the call originator on the call (e.g., so that that call target is then connected to the transfer entity's telephony device). In some embodiments, a call with a call target may be transferred multiple times to multiple transfer entities.

Real-Time Selection of Caller ID Information

In some embodiments, a target management system has a plurality of caller identification selection processes that enable a user to define a number of ways to select a preferred caller ID number to use with an outbound call. For example, the system may allow an entity to provide customized caller ID preferences for automatic selection of a particular caller ID selection method to be used for particular outbound calls (or groups of calls). Thus, in some embodiments, caller ID preferences may define a hierarchical arrangement of various Caller ID selection methods, such as the following Caller ID selection methods:

Custom: selects caller ID numbers based on the individual call target

Campaign: selects caller ID numbers based on a specific campaign (e.g., a marketing campaign) for which the outbound call is made, Location: selects caller ID numbers based on a location of the call target, such as to include an area code that is associated with a known city of residence of the call target, Company: selects caller ID numbers based on the company making (or requesting making of) the outbound call, Agent: selects caller ID numbers based on a specific agent requesting the outbound call, or may use a caller ID number specific to the agent.

The above Caller ID selection methods may each include rules, code, or other instructions that are executable by a computer processors for selection of a particular caller ID number for a particular call. Each of these selection methods is associated with a corresponding "type" of caller ID or "caller ID type," such that when a location caller ID type is selected for an outbound call, the corresponding location caller ID selection method is executed (e.g., software code is executed) to determine a particular caller ID number for the outbound call. While caller IDs are discussed in some sections of this disclosure with reference to caller ID numbers, such caller IDs may also, or alternatively, include CNAM information.

In some embodiments, the caller ID preferences may include a hierarchy of multiple caller ID types and corresponding selection methods that are used for outbound calls. In some embodiments, an administrator may adjust the hierarchy to meet preferences of the administrator, a company, an agent, and/or a specific product or campaign. These hierarchal preferences for determining a caller ID type that may then be automatically applied by the target management system such that the appropriate caller ID selection method can be quickly selected and executed to select a particular caller ID (e.g., caller ID number and/or CNAM data) for use in each outbound call (or group of calls in some implementations). For example, when a call originator selects a user interface option to initiate a call, the caller ID management system may determine and apply the appropriate caller ID preferences (e.g., a hierarchy and/or rule based association of caller ID types associated with a particular marketing campaign), select and execute the appropriate caller ID selection method to determine a particular caller ID for the outbound call, and initiate the call using that determined caller ID number in real-time. Thus, complex rules for selecting an appropriate caller ID number may be processed in a matter of 0.2-5 seconds, such that the call originator can efficiently use the caller identification management system without significant lapse of time between requesting a call and initiation of the phone call using the dynamically selected caller ID number.

In some embodiments, the target management system may be configured to automatically generate or modify caller ID preferences based on a model for predicting and determining rules and/or hierarchy of one or more caller ID types. For example, instead of a set hierarchy, the caller ID preferences may be determined and/or modified based upon analysis of the rate of calls answered by targets, the return of calls answered by targets, and/or by other metrics associated with previous calls. In some embodiments, the target management system may determine different metrics for different customers, campaigns, products and/or offerings. For example, if a call target is associated with a mortgage vertical (e.g., is to be contacted for purposes of attempting to initiate a mortgage with the call target), the system may use different caller ID preferences (e.g., a first caller ID type hierarchy or selection model) than if the target is associated with an education vertical (e.g., a second caller ID type hierarchy or selection model). In some embodiments, the system may also analyze the known attributes of a target to determine an appropriate caller ID type to use. For example, feedback from call success rates may be used to adjust how certain attributes are weighted toward one type of caller ID or another.

Among other caller ID preferences that may be selectable for use by the caller identification management system, caller ID numbers may be selected based on a geographic information associated with a particular call target, such as by a location caller ID selection method. Use of such geographically relevant caller ID information, such as a local telephone number to a particular call target, may increase likelihood of the call target answering the phone call. Additionally, a local telephone number may provide a non-long distance number for a target to call back to, which may increase the likelihood of the target calling back. For example, a target may be more likely to call back to a number that may not incur long distance telephone charges or is more likely to be from somebody known to the target. In addition, an individual may be more likely to answer or respond to a local number than to a number from a distant region, or from a toll free unknown number. In some embodiments, geographic data associated with a call target may be a current location of the call target, even if that current location is not the expected residence location (e.g., as included in a lead record) of the call target. For example, an IP address (and/or other identification information) received with a lead (e.g., in a "lead record" that includes information regarding a call target) may be translated to a geographic location, such as via an integrated or third-party IP to geographic location lookup service. Thus, a caller ID number may be selected to appear to be from the determined geographic location of the lead. For example, if an individual is on vacation and browsing the Web for a particular service, information regarding the individual's device (e.g., a mobile phone) may be captured by a web site and provided to the caller ID management system. If the device information includes an IP address or other information that can be used to determine a current location of the individual, the location caller ID type may determine a caller ID number that is local to the individual's determined current location. Depending on the embodiment, such location information may be utilized by the location caller ID selection method based on certain criteria, such as only when the location information is fresh (e.g., less than 1 day old). In some embodiments, the geographic data used for selection of a local caller ID number may be other locations that are not the call target's residence location. For example, the location caller ID selection method may be configured, such as by a particular requesting entity, to use a residence, work, or school location as the geographic data from which the caller ID number is determined. Such variance in geographic data usage, beyond just the call targets home location or home area code, may achieve increased response rates either when used in an initial contact attempt (e.g., if prioritized as such by the requesting entity) and/or in subsequent contact attempts that use different caller ID numbers.

In some embodiments the target management system may also manipulate the caller ID information that is displayed to the call originator. For example, the target management system may initiate calls by initiating a telephone call to a phone (for example VOIP, cell phone, wired line, or the like) to the call originator before initiating a call to the call target (or the calls may be initiated concurrently or to the target initially and then to the call originator in other embodiments). In certain situations, a call may be originated by the call target as an inbound call to the target management system, which can then distribute the call, with custom caller ID (as discussed further below), to a call agent, in real time.

In order to better indicate to the call originator the type, status, quality, and/or other attributes of a call, the target management system may set a specific caller ID which informs the call originator of additional information about the call. For example, the call originator may recognize that certain caller ID numbers indicate inbound calls, some indicate scheduled calls, some indicate newly distributed calls, or some numbers may indicate that a specific call is from a high value target.

In some embodiments, in addition to sending a caller ID number to a call originator and/or call target, the target management system may make additional information available to call targets using CNAM information. For example, the system may set CNAM information in one or more CNAM databases to supply additional information to a call originator about a call that is coordinated by the target management system. For example, instead of requiring the call originator to recognize a specific telephone number, the call originator's system may retrieve CNAM data which specifically states the type or status of a call. In some embodiments, CNAM data may be manipulated to send additional information to a call target as well. For example, additional information about the call originator or an entity represented by the call originator may be provided to the call target.

In certain situations, an existing call between a call originator and call target may also be transferred to another telephony device that joins the call (to create a three-way call) and/or replaces the call originator on the call (e.g., so that that call target is then connected to a different telephony device). For example, in some situations it is useful for multiple individuals to each speak to a call target, such as at different stages of a sales process. In such situations, a transfer entity that is added to and/or replaces the original call originator, may benefit from additional information regarding the call target and/or the original call between the call originator and call target. For example, the transfer entity may be an agent that sets up final details of a deal after the call originator or other initial contact makes a sale to the target or advances a sale. In some embodiments, the system may address the situation of providing additional information to a transfer entity through the use of specific caller ID numbers or CNAM data as discussed above. For example, the CNAM or specific caller ID number may be set such that a particular vertical, segment, or other information about the call target or transferring agent (e.g., the call originator) may be communicated to the transfer entity.

Example System Architecture

FIG. 1A depicts a block diagram of a target management system 100 configured to provide target calling services between a call originator 110 and a call target 120 as used in some embodiments through a telephony network 180. As noted above, a "call originator" or "call originator 110" generally describes a person or group of persons that request initiation of a telephone call, and a "call originator system" or "call originator system 110" generally describes a computing system used by the call originator to initiate the call (such as via communications with the target management system 100 and/or other devices, as discussed herein). However, in some instances, these terms may refer to either the person requesting initiations of the call and/or the computing system used by the person. For example, "call originator" may refer to the computing system used by an individual that is originating a call, such as a mobile phone, table, computer, desktop phone, VOIP phone, etc.

In some embodiments, the target management system 100 may include a user interface component 130, a target identification component 140, a call management component 150, a caller ID selection component 160, and a caller ID management component 170. In some embodiments, the target management system 100 may comprise fewer or additional components. In addition, the components of the target management system 100 may be implemented as part of a single system as shown in FIG. 1A or may be implemented as part of several distinct systems, and by one or more different entities in some implementations.

In some embodiments, call originator 110 may be a computer or telephone system used by an individual attempting to make a call to another individual or organization (referred to herein as a "target" or "call target," which includes an individual or group of individuals to which a call is directed and/or a calling device, such as a calling device associated with a particular telephone number, associated with the individual or group of individuals). The call originator system 100 may include input and output devices 112, which may include one or more of speakers, headphones, computing peripherals, such as keyboards and mice, telephones, display screens, or other input or output devices which may enable or aid a user in placing a call to a call target 120.

The example call originator system 110 also include a communication interface 114 that communicates with or through a telephony network 180 to a call target 120. In some embodiments, the communication interface 114 may comprise a session initiation protocol terminal, a primary rate interface terminal, or another system configured to transfer communications through a PBX system to dedicated voice lines, such as a public switched telephone network, or in a packet delivered voice communication channel over the internet or another network. In some embodiments, the call originator system 110 comprises a computing system that includes components similar to those discussed below in FIG. 5 with reference to the target management system 100. In some embodiments, the communication interface 114 includes an API that communicates with the call management component 150 in order to provide call information to the call management component 150, which may then initiate the telephone call. For example, the call information may include a call target number, a call target caller ID number, a call originator number, and/or a call originator caller ID number. This information can then be used by the call management component 150 to initiate calls to the call target and call originator with the indicated caller ID information. In some embodiments, the call management component 150 is operated and executed by a third party service that establishes connections, such as digital voice connections, with each of the call target and call originator and joins the two calls together, such as in a conference call line.

In some embodiments, the call originator 110 may interact with a user interface component 130 of the target management system 100. The user interface component may include a click-to-call module 132 and/or a call manager 134, as well as other components. In some embodiments, the click-to-call module 132 provides a user interface element or elements that enable the call originator 110 to initiate the process of calling a call target 120. In some embodiments, a click-to-call element may be associated with a particular call target with information on the call target presented on a user interface. In some embodiments, a click-to-call element may be associated with no particular call target, but may instead be configured to initiate a process of automatically selecting a call target from a list of available call targets, such as based on prioritization rules.

In some embodiments, the call originator 110 may initiate a call through other means than a click-to-call element on a user interface. In some embodiments, the call function manager 134 enables the call originator 110, or another entity or system taking part in a telephone call utilizing the target management system 100 to initiate one or more call functions during a call. For example, the call function manager 134 may generate one or more user interface elements, which a user may select, that cause a call taking place to be put on hold, transferred, recorded, conferenced to additional parties, or otherwise modified according to the instructions received. In some embodiments, the user interface component 130 may include fewer or additional elements enabling additional features to a user.

As shown in FIG. 1A, in some embodiments, the user interface component 130 may be included as part of target management system 100 (and, thus, may not be included, or only partially included in, the call originator system 110). For example, the call originator system 110 may access a user interface generated by the user interface component 130 through a browser over a network. In some embodiments, the call originator systems 110 may include a user interface component 130, which may provide some or all of the features as the user interface component 130 shown in FIG. 1A as included as part of target management system 100. For example, the call originator 110 may generate and provide to a call initiator a user interface with various call initiating and management elements. Instructions to initiate, modify, and/or terminate a call may then be passed to a target management system 100 over the internet or another network, for example, using an API associated with the target management system 100. In some embodiments, the target management system 100 may be included as part of call originator systems 100.

In some embodiments, a click-to-call module 132 may interact with a target identification component 140 to determine a target to which a call should be initiated. The target identification component 140 may access a list of potential targets which the call originator 110 has permission or access to call (and/or some other list of potential targets). In some embodiments, the target identification component 140 may access a target database 145 that includes a set of targets that may be contacted through the target management system 100. In some embodiments, the target management system 100 may include a list of potential targets including contact information (e.g., first name, last name, residence address, work address, etc.), as well as additional information known about the targets, such as products the target is interested in, hobbies, demographic information, previous contact history, or any other information that may be helpful when contacting the target. In some embodiments, the targets in the target database 145 may be associated with one or more call originators that have permission or access to contact the targets. In some embodiments, the target identification component 140 may then select the highest priority target from the list of potential targets as the next target to call when initiating a communication, such as in real-time in response to selection of a click-to-call user interface element by the call originator. For example, each of a plurality of lead records may be scored, based on one or more of various factors, in order to select a highest priority lead record as the next call target for the call originator. Such lead scoring may be performed by a lead scoring component, such as is described in pending U.S. application Ser. No. 14/091,869, titled "Lead Scoring," filed Nov. 27, 2013, which is hereby incorporated by reference in its entirety and for all purposes.

In some embodiments, the target management system 100 may include a caller ID selection component 160 that accesses caller ID preferences associated with respective calls, determines the appropriate caller ID type for the call (e.g., based on hierarchical caller ID preferences), and executes that determined caller ID selection method (corresponding to the determined caller ID type) to select caller ID numbers for use in the respective calls. The caller ID selection component 150 may also access a caller ID management component 170 that stores available caller ID information when executing the determined caller ID selection method, such as to identify an available caller ID number for a particular geographic location as part of the location caller ID selection method. As noted above, the caller ID preferences may include rules for selection of caller ID types for particular calls, such as may be set by a system administrator that oversees calling activities of the call originator. For example, a caller ID number for a call target may be selected based on a hierarchy of caller ID types, such as custom, campaign, geographic, agent, and/or company caller ID types and corresponding selection methods. An example process for selecting caller identification numbers using caller ID preferences that include one or more possible caller ID types in a prioritized or hierarchical relationship is discussed below with reference to FIG. 3.

In this embodiment, the caller ID management component 170 includes a caller ID database 172, a caller ID resource manager 174, and a caller ID acquisition component 176. The caller ID database 172 may include a list of telephone numbers which are available to the target management system 100 for use while initiating or transferring telephone calls. For example, the telephone numbers in the caller ID database 172 may be telephone numbers that have been purchased by an organization supervising the call originator 110 and/or the provider of the target management system 100. Advantageously, the caller ID management system 100 may acquire many telephone numbers with diverse geographic areas and maintain ownership of those numbers so that requesting entities that later use the caller ID services of the system 100 may use those caller ID numbers without needing to purchase such numbers. Similarly, caller ID numbers may be used by multiple requesting entities, such as might be done for a particular area code that is desired by those requesting entities but which is no longer available to purchase.

In some embodiments, the telephone numbers stored in the caller ID database 172 may have additional information associated with them indicating appropriate times or situations for using the numbers. For example, the telephone numbers may have associated geographical data, clients, agents, campaigns, companies, which indicate when a caller ID should be used by the system. The caller ID selection component 160 may utilize this information when selecting an appropriate telephone number for initiating, transferring, or modifying a telephone call. In some embodiments, additional information may be stored in a database and associated with particular telephone numbers. In some embodiments, the telephone numbers may be stored with the number and additional alpha-numeric data providing information to the system about uses for the telephone number. For example, in one embodiment telephone numbers may be stored in a format such as "XXXXX###-###-####." Where the pound signs indicate a particular telephone number and the "XXXXX" provides information about geographical data, clients, agents, campaigns, companies, or other information about uses for the particular telephone number. In various embodiments, telephone numbers may be stored in the caller ID database 172 in a variety of manners and formats, which enable the system to quickly and efficiently select a telephone number in real-time for use in an outbound telephone call to a call target. References herein to "databases" may refer to any type of data structure for storing and/or organizing data, including, but not limited to, relational databases (for example, Oracle database, mySQL database, and the like), spreadsheets, XML files, and text files, among others. The various terms "database," "data store," and "data source" may be used interchangeably in the present disclosure.

In some embodiments, instead of, or in addition to, storing outbound telephone numbers, a caller ID database 172 may have stored other alpha-numerical information for use when setting the caller ID information, such as CNAM data, for calls to call targets, call originators, and/or transfer entities. For example, textual caller ID information indicating the source of a phone call may be included with the outbound telephone number. Thus, a call target may receive a selected outbound telephone number, a selected call source, other textual information, a combination of a selected telephone number and textual data, and/or the like.

In some embodiments, the caller ID management component 170 may include a caller ID resource manager 174. The caller ID resource manager 174 may automatically manage the available telephone numbers for use by the target management system 100. As noted above, and based on caller ID preference and/or available caller ID types, the target management system may place calls using a caller ID number familiar to the call target 120, or otherwise indicating or conveying information of use to the call target 120. In order to maintain sufficient telephone numbers available in the caller ID database 172, without having too many unused numbers, the caller ID resource manager 174 may monitor the availability and usage of numbers in the caller ID database 172. For example, if telephone numbers with a specific area code, or associated with a specific geographic region are frequently requested by the caller ID selection component 160, but there are few available numbers in the system having such characteristics, the caller ID resource manager 174 may determine that it should attempt to acquire additional telephone numbers with the characteristic.

In one embodiment, the caller ID resource manager 174 may generate a usage rate for caller ID numbers within various geographic regions, such as within a ZIP or area code, and determine which area codes are most heavily used and, thus, should be updated with new numbers in those area codes if possible. For example, the system may determine that 10 available caller ID numbers with a first area code were used in 200 calls within a week, while caller 20 available caller ID numbers within a second area code were used in only 40 calls over that same time period. Thus, in this example, the usage ratio of caller ID numbers in the first area code (200:10) is much higher than the usage ratio of caller ID numbers in the second area code (40:20). Thus, the caller ID database may be configured to automatically request additional telephone numbers within area codes with a high usage ratio (e.g., above a certain usage ratio) and/or dispose of some telephone numbers in area codes with a low usage ratio (e.g., below a certain usage ratio). Similarly, the caller ID resource manager 174 may determine trends in usage of various groups of caller ID numbers, such as increase (or decrease) in usage of caller ID numbers in each area code over a period of 1 month, 6 months, 12 months, etc., and use the trend information to determine area codes that are becoming increasingly used. The caller ID resource manager 174 may then be configured to automatically obtain additional telephone numbers within are codes with a trend of increasing use. In some embodiments, the caller ID resource management may be set to maintain a predetermined quantity of telephone numbers in each of a variety of area codes (and/or other segment of telephone numbers, such as a particular quantity per ZIP code, city, or population segment).

Depending on the embodiment, obtaining new caller ID numbers (e.g., telephone numbers) comprises requesting telephone numbers from a carrier or agent of the carrier that is authorized to sell telephone numbers. In one embodiment, telephone numbers may be purchased and then maintained indefinitely as long as a monthly subscription fee is paid. In some embodiments, disposing of telephone numbers, which may also be referred to as decommissioning or removing telephone numbers, comprises indicating to the carrier that a particular number is no longer desired and halting payment of the monthly subscription. In one embodiment, a telephone number provider (e.g., an agent of one or more carriers that is authorized to sell telephone numbers) provides an API that allows the caller ID resource manager 174 to transmit an API command to the provider indicating when a number is to be decommissioned. Thus, the caller ID resource manager 174 may automatically determine additional telephone numbers to add to the caller ID database and automatically transmit electronic request to the provider to obtain the telephone numbers, without human intervention.

In some embodiments, through use over time and tracking of usage statistics, the caller ID resource manager 174 and/or the caller ID selection component 160 may designate specific of numbers for a particular area code (or other area or segment) to specific campaigns, agents, or call targets. In such cases, the number of available numbers for the area codes may fall and the caller ID resource manager 174 may determine that additional numbers are needed.

In some embodiments, the caller ID resource manager 174 may also assign or otherwise designate specific telephone numbers in the caller ID database 172 to specific call originators, call targets, campaigns, geographic areas, and/or area codes. In addition, the caller ID resource manager 174 may determine that certain assignments or designations are no longer needed or appropriate. For example, if a campaign for a company has ended, or has been unused for a specified period of time, the caller ID resource manager 174 may determine that the telephone numbers reserved for use only by that campaign may be released for other uses outside of the campaign. For example, the association to the campaign may be removed from storage caller ID database and the telephone numbers may be reallocated to a general pool of numbers for use by the caller ID selection component 160.

In some embodiments, the caller ID resource manager 174 may determine that specific telephone numbers are not selected by the caller ID selection component 160, or else are not successful when used, and may therefore determine that the telephone numbers are not necessary. In such situations, the caller ID resource manager 174 may determine that the number should be decommissioned, such as by selling rights to the telephone number and/or not renewing a subscription fee for maintaining the telephone number. As noted above, in some embodiments decommissioning telephone numbers may be performed automatically by the caller ID resource manager 174, such as via a single API command sent to a provider of the telephone number. As maintaining additional telephone numbers may require additional money and/or computing or other resources, removing unused or unnecessary numbers from the system may be beneficial to the operation and cost.

In some embodiments, the caller ID resource manager 174 may also update the CNAM values associated with one or more numbers used by the system. For example, in order to perform processes as described with reference to FIG. 6 below, the caller ID resource manager 174 may update the CNAM value stored in one or more CNAM database 179. For example, the caller ID resource manager 174 may access a system or service which maintains a CNAM database through an API or other networked connection and update the CNAM associated with a specified number. For example, a university that is calling a plurality of potential applicants to the University, such as in a recruiting push, may want to have different CNAM values displayed to different potential applicants. Thus, for a caller ID number used by a University the CNAM data may be set initially to "UNIV-ATHLETICS" for calls to potential applicants potentially interested in athletic programs at the university, and calls are placed using that caller ID number for a two week period. Subsequently, potential applicants with an interest in theater at the university may be called, but prior to calling those potential applications (e.g., over a subsequent two week period), the CNAM value for the same caller ID number may be updated to "UNIV-THEATER." Thus, the pick-up rate for the targets may be increased in view of the targeted CNAM values, while using a common phone number for the university.

In some embodiments, the CNAM values for phone numbers may be updated through electronic communications, such as API calls, to a CNAM database (or manager of one or more CNAM databases) so that the CNAM values are available to call targets more quickly. For example, in some embodiments the CNAM values may be updated in 48 hours or less, such as 24 hours or even 1-5 hours or less.

In some embodiments, the caller ID acquisition component 176 acquires telephone numbers from one or more third party telephone number sources 178. The numbers may be acquired based on instructions of the caller ID resource manager 174, for example. In some embodiments, the third party telephone number sources 178 may include one or more telephone service provider systems, which may be automatically queried for additional telephone numbers to rent or purchase having specific characteristics. As noted above, in some embodiments the caller ID acquisition component 176 automatically, without human intervention, electronically requests and obtains additional telephone numbers as it determines such numbers are needed. Thus, the inventory of available telephone numbers in the caller ID database may dynamically change over time automatically in response to monitoring and resource optimization provided by the caller ID acquisition component 176.

In some embodiments the target management system 100 also includes a call management component 150. The call management component 150 may initiate, join (e.g., combine on a conference line or otherwise join two or more calls) monitor, modify, and/or terminate calls made through the target management system 100. In some embodiments, the call management component 150 may receive call information from the user interface component 130, the caller ID selection component 160, and/or other systems or component within or outside of the target management system 100.

In some embodiments the call management component 150 interacts with the call originator system 110 and/or call target system 120 through a telephony network 180. For example, the telephony network 180 may include a networked or cloud based telephony system capable of initiating, joining, maintaining, monitoring, modifying, and/or terminating calls through the internet, mobile phone communication protocols, Plain Old Telephone System (POTS), public switched telephone networks, and/or any other communication mediums configured to transmit voice data.

In some embodiments, the call management system 100 may initiate telephone calls through the telephony network 180 according to the processes described below with reference to FIG. 2. For example, in some embodiments, the call management component 150 may initiate a call by establishing a connection with the call originator system 110, such as via a phone call to the telephone number of the call originator system 110.

Figure 1B:
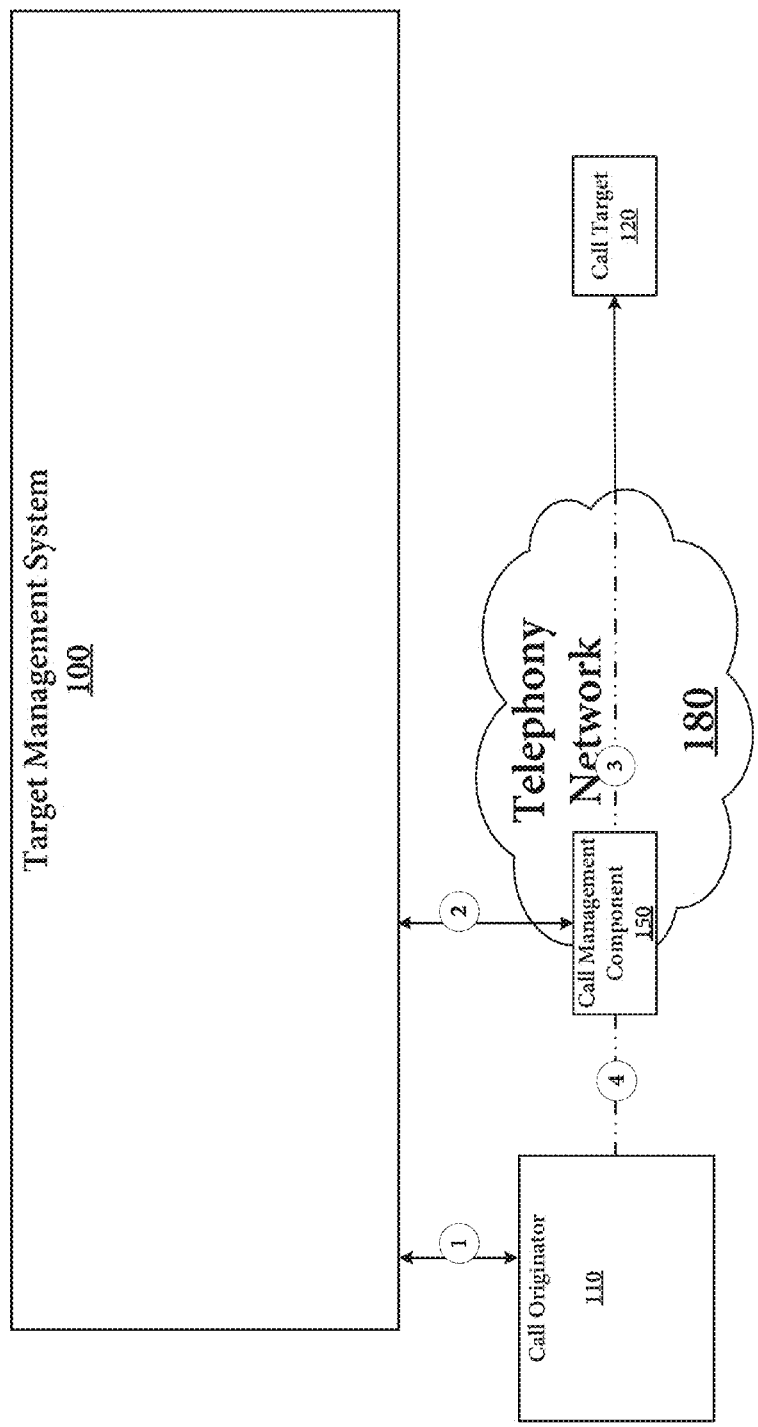
Figure 1C:
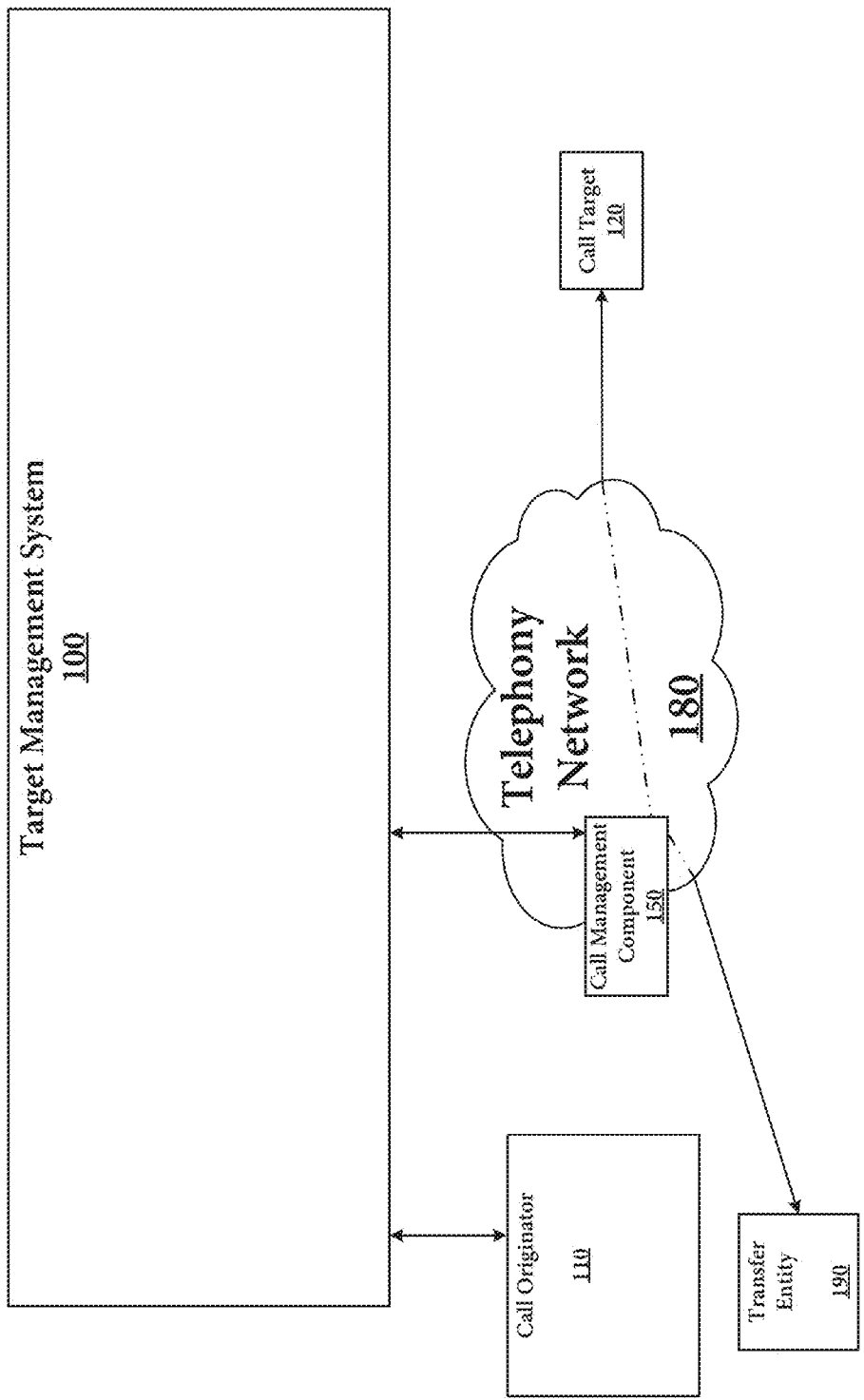

FIG. 1C is a block diagram illustrating one embodiment of call initiation using a call management component 150 external to the target management system 100. As noted above, depending on the embodiment, the call management component 150 may be entirely or partially executed by a third-party. For example, a third party such as Twilio may offer call management services through an online API. In other embodiments, the call management component 150 may be part of the target management system 100.

Example of FIG. 1B, the call originator 110 has requested a call to a particular call target 120 via the target management system 100. As noted above, in some embodiments, the target management system 100 may provide a recommended (or required in some embodiments) next contact for the call originator 110, such that the target management system 100 actually selects the call target 120 that the call originator 110 will be contacting via a telephone call. In such an embodiment, action one of FIG. 1B may not be performed. Alternatively, action one may comprise the target management system 100 informing the call originator 110 of the call target 122 which a telephone call will be initiated on behalf of the call originator 110 (e.g., without the call originator 110 specifically identifying the call target 120 is for.

As discussed further herein, the target management system 100 may use various algorithms and characteristics of potential call targets to select the appropriate caller ID to provide to the call target. The target management system 100 then transmits a request to the call management component 150 to initiate a call between the call originator 110 and the call target 120. Depending on the embodiment, the information included in the API call to the call management component 150 may include various information. For example, the API call may indicate:

(a) call target telephone number—e.g. 123-456-7890
(b) caller ID to send to call target—e.g., 123-098-7654
(c) call originator telephone number—e.g., 111-111-1111

In this embodiment, the call management component 150, using the information in the API call can initiate telephone calls with both the call target 120 and the call originator 110, in either order, and then connect the two calls in a conference line so that a telephone call is established. In some embodiments, the API data sent to the call management component may have multiple stages (e.g., may actually be multiple API calls). For example, the initial API call may have the call originator telephone number and request initiation of the call with the call originator. Once the call is answered by the call originator (which may be detected by the call management component 150 that is monitoring the call), the call management component 150 may query the target management system 100 for information regarding another call to connect to a conference line. In response, the target management system 100 may then transmit the call target telephone number and caller ID information for the call target. In one embodiment, the call target may not be identified until this query from the target management system 100 is received, such as in real time based on current available call targets.

In some embodiments, the API call to the call management component 150 includes further information, such as a caller ID number to provide to the call originator also. For example, the API call noted above may be supplemented with: (d) call original caller ID—e.g., 222-222-2222. As discussed elsewhere herein, the caller ID information transmitted to the call originator may provide various types of information to the call originator, such as status or type of call target to which the call originator is being connected (e.g., via a correlations known caller ID numbers and status/types of calls and/or view CNAM data associated with caller ID numbers, such as is discussed further below).

When establishing a connection with the call target 120, the call management component 150 may include a caller ID number provided by the caller ID selection component 160, such as based on a caller ID type selected according to caller ID preferences selected for the call, so that the provided caller ID number is viewable by the call target 120 on the incoming telephone call. Depending on the embodiment, the call management component 150 may be configured to initiate a connection first with the call target 120 and then with the call originator 110 or vice versa, for example, to the call originator 110 first and then to the call target 120. Similarly, the call management component 150 may initiate calls to both the call originator 110 and the call target 120 concurrently. In some embodiments, the API call to the call management component 150 indicates in order in which calls should be initiated to the multiple parties. In some embodiments, an entity requesting calls by the target management system 100 may provide preferences on orders of calls.

In some embodiments, joining of two (or more) calls by the call management component 150 includes transferring each call to a common conference line. In some embodiments, once the calls are joined communication between the call originator device 110 and the call target device 120 is performed via the telephony network 180 without further involvement of the call management component. In other embodiments, the call management component 150 and/or the target management system 100 monitors part or all of the call, such as by maintaining a connection with the conference line. In some embodiments, the target management system 100 is connected as a third connection to a conference line including a call originator 110 and a call target 120 (and/or other others), such that the target management system 100 may monitor the call. For example, the call management system 150 may be instructed (e.g., by API call) to call the call originator first and, when connected, place on a conference line, then call the target management system 100 (e.g., a line for monitoring calls by the target management system 100) and, when connected, place in the conference line and, finally, call the call target and connected to the conference line (either when connected or while the connecting is still ringing the call target's phone). In other embodiments, the calls may be performed in any other order.

For example, the target management system 100 may track characteristics of the call, such as total call time, time/percentage of call when call originator 110 was speaking, time/percentage of call when call target 120 was speaking, and/or other characteristics. In some embodiments, the target management system 100 performs a voice-to-text process on the conversation (and/or of particular participants of the conversation) and performs keyword analytics on the text, such as to identify words, phrases, frequency of words or phrases, etc. associated with the call originator 110 and/or call target 120 related to outcomes of the calls. Thus, calls with a high closing rate (e.g., a product or service was sold to the call target 120) may be analyzed to identify characteristics of the speech used by call originators during those calls and use that analytics in training and/or monitoring other call originators. For example, a happiness score for call targets may be predicted based on analysis of voice-to-text information and/or other speech analysis, such as tone of the call target, to provide indications of how happy the call targets are. This information may be used to track agent success rates and may further be associated with caller ID numbers (and/or CNAM data) provided to respective call targets. Thus, caller ID numbers with regularly very low happiness scores of call targets may be indicative of a low value of those caller ID numbers, such as numbers that may indicate to the caller that the call is from someone that they probably don't want to speak with.

Depending on the embodiment, the call management component 150 may set the caller ID information on an outbound call using any 202-type modulation, line reversal, or other protocols, for instance, and may be sent using signaling appropriate for receipt by the call target's systems, for example, using DTMF, V.23, or FSK signaling.

As noted above, in some embodiments certain operations discussed herein with reference to the call management component 150 may be performed by a third party system.

During the course of a telephone call, the call originator 110 may interact with call function manager 134, such as via user interfaces generated by the call function manager 134 and/or the communication interface 114, to direct the call management component 150 to modify or otherwise interact with the call. For example, a call originator using the call originator system 110 may instruct the target management component 150 to conference in another number, transfer a call, record a call, place a call on hold, or otherwise modify an ongoing phone conversation.

Example Call Transfer

FIG. 1B illustrates a call connection after transfer of the call from the call originator 110 to a transfer entity 190. As discussed above, the call management component 150 may transfer a call (e.g., the call between the call originator 110 and the call target 120 illustrated in FIG. 1A), to a transfer entity 190, such as after a connection has been established between the call originator 110 and the call target 120 (and perhaps a discussion of some/any length has already occurred). In one embodiment, transfer of the call is performed in response to the call originator 110 and/or the target management system 100 determining that the call target 120 should be transferred to another entity—the transfer entity 190 in the example of FIG. 1A, such as when the call target requests to speak to a different person (e.g., a manager) or the call target is moved to a different phase of a sales cycle by the call originator. As shown in FIG. 1B, the call to the transfer entity 190 may be connected with the existing call (such as by the call management component 150 initiating a call with the transfer entity 190 and then joining that call with the conference line) and then the call originator 110 may be removed from the call (such as by the call management component 150 disconnecting the call originator 110 from the conference line or the call originator disconnecting from the call) so that the transfer entity 190 and call target 120 remain on the conference line and are able to communicate.

In some embodiments, the call management component 150 may advantageously include caller ID information in the call to the transfer entity 190 that provides relevant information regarding the call and/or call target 120 to the transfer entity 190. For example, the caller ID number provided to the transfer entity 190 may be the same caller ID number used when initiating contact with the call target 120 (e.g., the outbound telephone number selected by the caller ID selection component 160), which may provide the transfer entity 190 with information about the purpose of the call. For instance, the call target 120 may have been contacted using caller identification information associated with a specific campaign. Thus, the provided campaign telephone number may be used by the transfer entity system 190 to identify the campaign, such as by performing an automatic lookup in a table or database (e.g., the caller ID database 172) storing associations between caller ID numbers and particular campaigns associated with those caller ID number. In other embodiments, the caller ID information may be the caller ID number provided to the call originator 110, so that the transfer entity system 190 can determine from whom the call is being transferred, such as a particular agent associated with the caller ID number and/or department of agents.

In some embodiments, the call management component 150 may provide the telephone number of the call target 120. This may enable the transfer entity 190 to know the identity of the target party. For example, the transfer entity system 190 may access the call target database 145 with a query for the lead record associated with the received caller ID number, which will locate the lead record of the call target 120. This process may be performed automatically by the transfer entity 190 in response to receiving the caller ID number, such that the lead record of the call target is displayed on a display of the transfer entity system 190 immediately (or within one or a few seconds) of transfer of the call to the transfer entity 190.

In some embodiments, a user of call originator systems 110 may select the caller ID number to be provided to the transfer entity 190, such as by using a call transfer element generated by the call function manager 134 as part of the call transfer request. In some embodiments, a combination of the various telephone numbers noted above may be included in caller ID information provided to the transfer entity 190. Furthermore, the caller ID information may be customized, such as to include alphanumeric characters that are identify the call originator 110, the call target, and/or call status. For example, a status of the call target 120 may be included in caller ID information in the call as it is transferred from the call originator 110 to the transfer entity 190.

Example Custom Caller ID Methods

Figure 2:
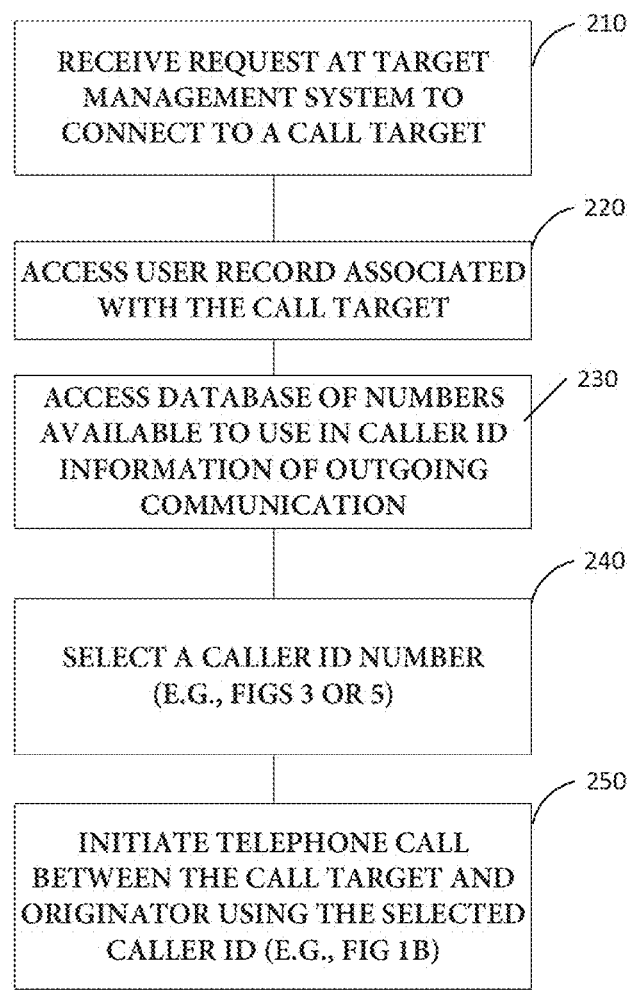
FIG. 2 depicts a flow diagram illustrating processes for initiating calls with a call target according to some embodiments.

FIG. 2 depicts an example of a high level flow diagram 200 as implemented in some embodiments showing the initiation of a telephone call with customized caller ID, such as may be implemented by the target management system 100 depicted in FIG. 1A. Depending on the embodiment, the method of FIG. 2 may include fewer or additional blocks and/or the blocks may be performed in order different than as illustrated.

In block 210 the target management system receives a request to connect to a call target. In some embodiments, the request may include a specified call target or may be a request to connect to a next call target. For example, the request to connect to a call target may indicate that a call originator is ready to connect to a next call target in a prioritized list of targets available to the agent, which may dynamically change as the list of targets is accessed by other call originators, time passes, and/or other factors that affect prioritization of targets changes. For example, the target management system may use prioritization and selection of targets for a call originator according to one or more of the embodiments disclosed in U.S. patent application Ser. No. 14/091,869, filed Nov. 27, 2013 and published as U.S. Publication No. 2014/0149178, which is incorporated by reference herein in its entirety.

In block 220, the system accesses target data associated with the call target. For example the call target may have data indicating the source of the target, products or services of interest to the target, previous contact with the target, geographic data of the target, demographic data about the target, and/or additional information that may be helpful when contacting the target. The system may access the target data from a local database or a separate system. In some embodiments, target data is provided to the system by the requesting entity attempting to initiate a call. For example, the request may include geographic data, campaign data, or other data about the target.

In block 230, the system accesses a bank of telephone numbers available to use in caller ID information of outgoing calls. The bank of available numbers may be as described with reference to the caller ID database 172 depicted in FIG. 1A. In block 240, the system selects an outbound telephone number to set in the caller ID information of a telephone call. The system may select the caller ID information based on information about the target accessed in block 220, data about the agent or other requesting entity, based on a combination of target and originator information, or based on other criteria. In some embodiments, in block 240, the system may follow process similar to those described in further detail below with reference to FIGS. 3 and 4.

In block 250, the system initiates a telephone call between the call target and originator with the caller ID information set to include the selected outbound telephone number, such as by one or more of the processes discussed with reference to FIG. 1B. For example, regardless of the telephone number or numbers associated with a phone line used by the call originator, the system may set or modify the caller ID information that will be sent to the call target to match the selected outbound telephone number.

Figure 3A:
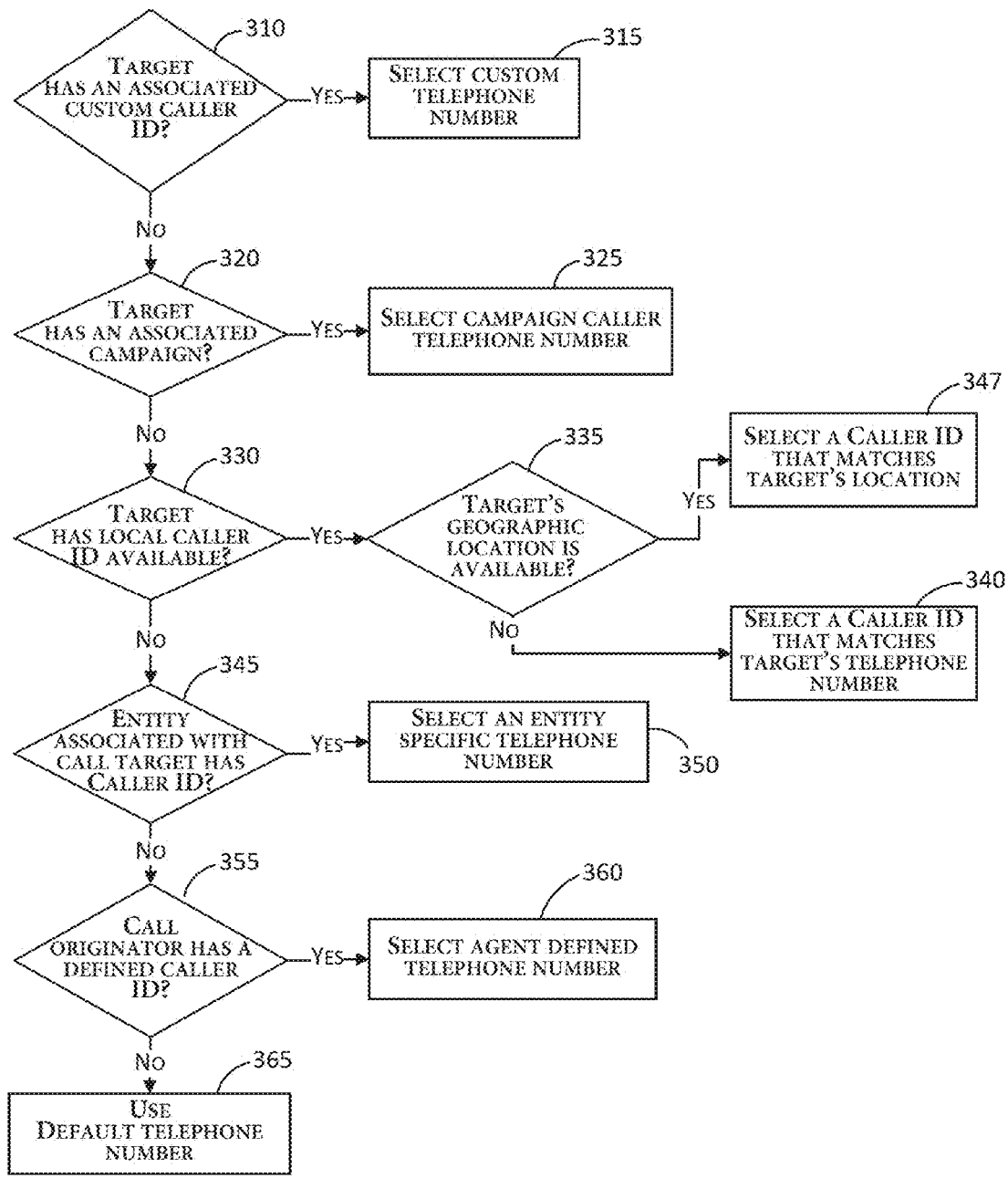
FIG. 3A depicts a flow diagram illustrating processes for selecting a telephone number to set in caller ID information of a phone call according to some embodiments.

FIG. 3A depicts a flow diagram 300 illustrating processes that may be performed by a target management system 100 to select an outbound telephone number to use in the caller identification information for an outbound call to a call target as used in some embodiments. For example, the caller ID selection algorithm shown in FIG. 3 may be performed by caller ID selection component 160 of the target management system 100 when accessing caller ID database 172 as shown in FIG. 1A. The processes depicted in FIG. 3 may enable a system to select the best available phone number to include as caller ID information for outbound calls to call targets. In some embodiments, there may be fewer or additional processes, in addition, the processes may performed in a different order than shown. For example, in some embodiments, an administrator may alter the hierarchy of telephone number preferences, which may result in the system searching for telephone numbers having specified characteristics in a different order. In some embodiments, the method of FIG. 3 may be performed in substantially real-time (e.g., in a matter of seconds, such as in one-five seconds) so that there is very little delay from the time a call originator requests initiation of a phone call and the call is actually initiated including dynamically selected caller ID information.

Figure 3B:
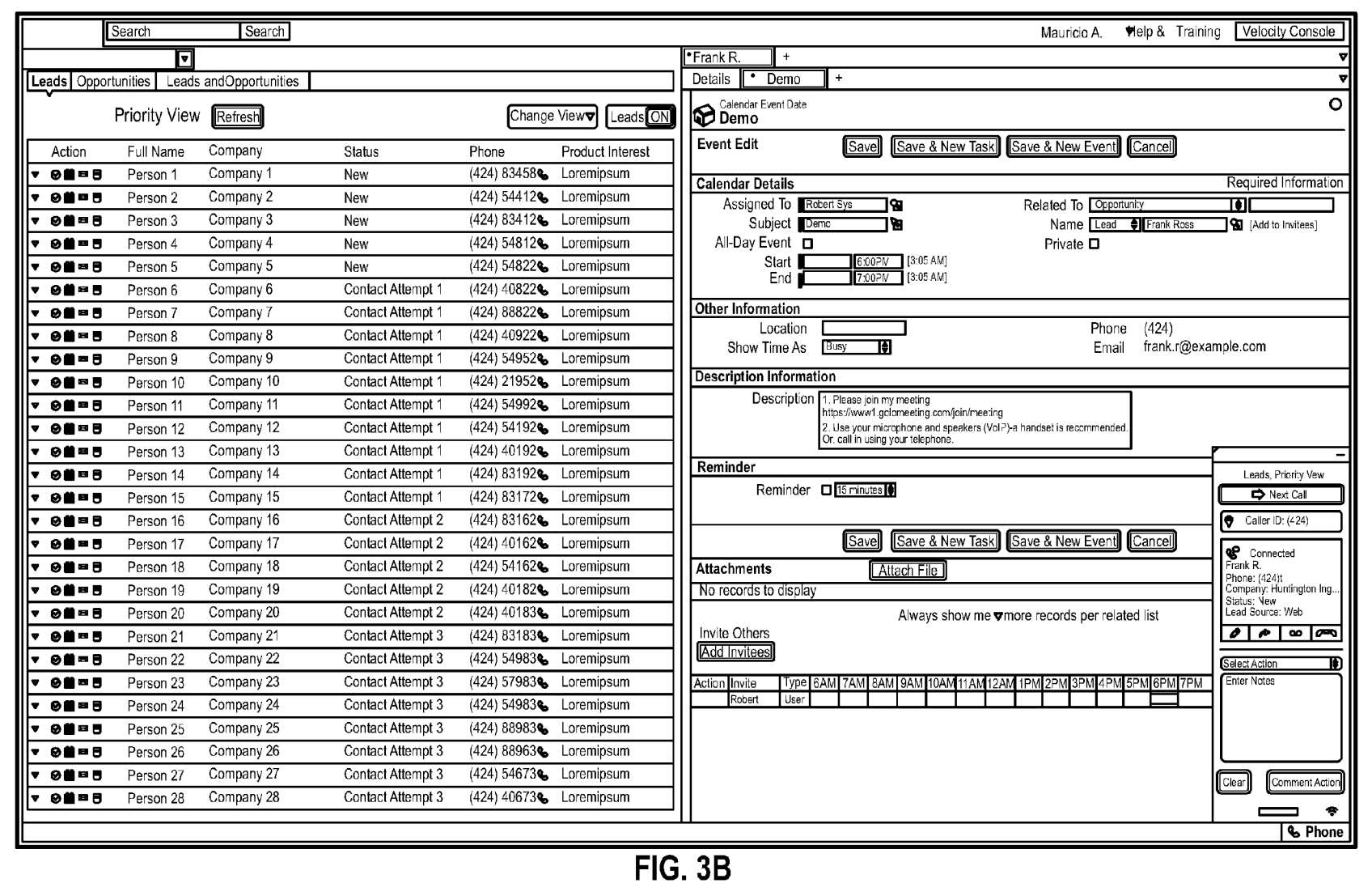

FIG. 3B illustrates an example interactive user interface that may be used by a user (e.g., a call agent) to view information regarding multiple lead records and select a particular lead record to contact via a telephone call, such as using caller ID information selected using the methods discussed herein. As illustrated in the example of FIG. 3B, the user interface includes a prioritized listing of lead records in the left pane and details regarding a particular lead record in the right pane. In this embodiment, the listing of lead records is automatically prioritized by the target identification component 140, which may perform real-time lead scoring (e.g., to determine a lead record that is a highest priority at the time the user wishes to place a call to a lead) using various algorithms to automatically select a highest priority lead record. Such lead scoring may be performed by a lead scoring component of the target identification component 140, such as is described in pending U.S. application Ser. No. 14/091,869, titled "Lead Scoring," filed Nov. 27, 2013, which is hereby incorporated by reference in its entirety and for all purposes. In some embodiments, the lead management and prioritization functions are performed by separate, such as third-party, software that interfaces with the target management system 100 in order to obtain caller ID information and/or initiate calls. For example, a third-party CRM application may be used to manage lead records and then, once a lead is selected by a user (or auto selected by the CRM application), the caller ID selection component 160, for example, receives a request from the CRM (e.g., via an API call to the caller ID selection component) to select a most suitable caller ID information for the lead based on one or more of the various methods discussed herein. Thus, in some embodiments the caller ID selection components and related methods for selecting of caller ID information are provided as a separate functionality than lead management and/or telephony functionalities. In other embodiments, all of these functions may be performed by a single entity via software components communicating with one another on one or more servers and/or user devices.

In the example of FIG. 3B, a lead record has been selected for calling, as indicated in the call interface in the lower right corner of the figure (either manually by the user or automatically using a click-to-call type of feature that automatically selected the highest priority lead record). In this example, the caller ID information provided to the lead record in the outgoing call is indicated to the user. In some embodiments, the caller ID selection method (e.g., the caller ID type) that was used in determining the indicated caller ID is also indicated in the user interface. For example, after performing a process such as is discussed below in order to determine an appropriate caller ID type for a particular call, the selected caller ID Type (e.g., geographic caller ID) may be indicated to the agent (e.g., via an icon next to the caller ID information).

Figure 3C:
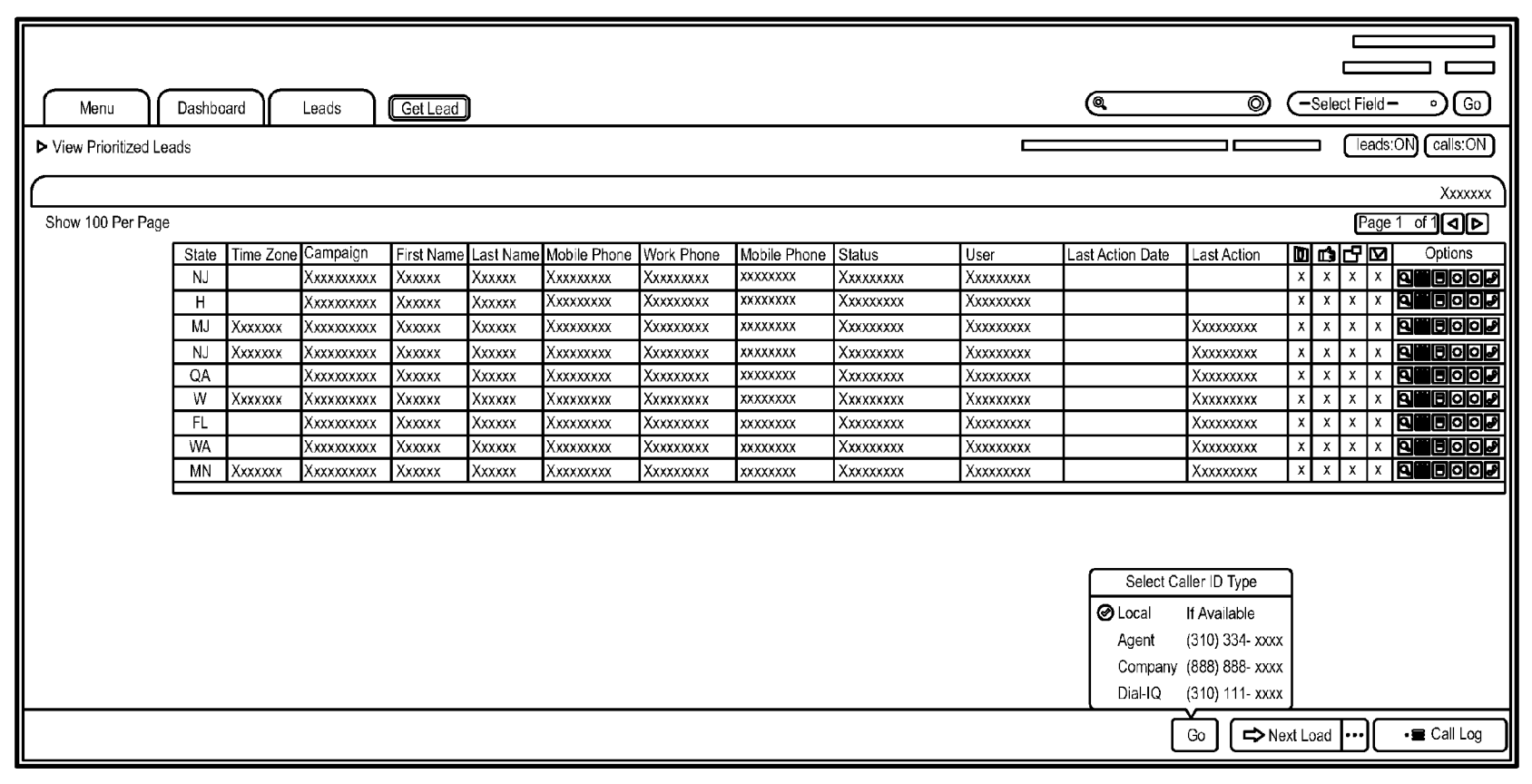

FIG. 3C illustrates another interactive user interface that may be used to manage lead records and initiate telephone calls using selective caller ID. In this example, the user can select a particular caller ID type to use for a next call. In this particular example, a CID button may be activated in order to provide options of available Caller ID Types that the agent can use, such as local, agent, company, Dial-IQ (e.g., a default number, such as a number of the device from which the call originator will be receiving the call), and/or any other caller ID types discussed herein or later developed. Thus, in some embodiments the user can select a desired caller ID type and that corresponding caller ID selection method will be used for subsequent telephone calls. In another embodiment, the caller ID type pop-up that is displayed when the CID button is activated indicates a preset prioritized ordering of caller ID types that will be processed for subsequent telephone calls, such as using a hierarchal or rules-based analysis of the particular lead record in order to determine which of the caller ID types should be selected. In one embodiment, the user can adjust the caller ID priorities for individual calls or groups of calls via the illustrated user interface, rather than reconstructing an overall caller ID type ruleset for selection of appropriate caller ID methods selected for particular leads. In some embodiments, the agent doesn't see the caller ID types; rather, the caller ID type is automatically selected, such as based on caller ID preferences, and automatically used for calls by the agent. Thus, the agent may be part of calls that are placed using various different caller ID types without even knowing what those caller ID types are.

Figure 3D:
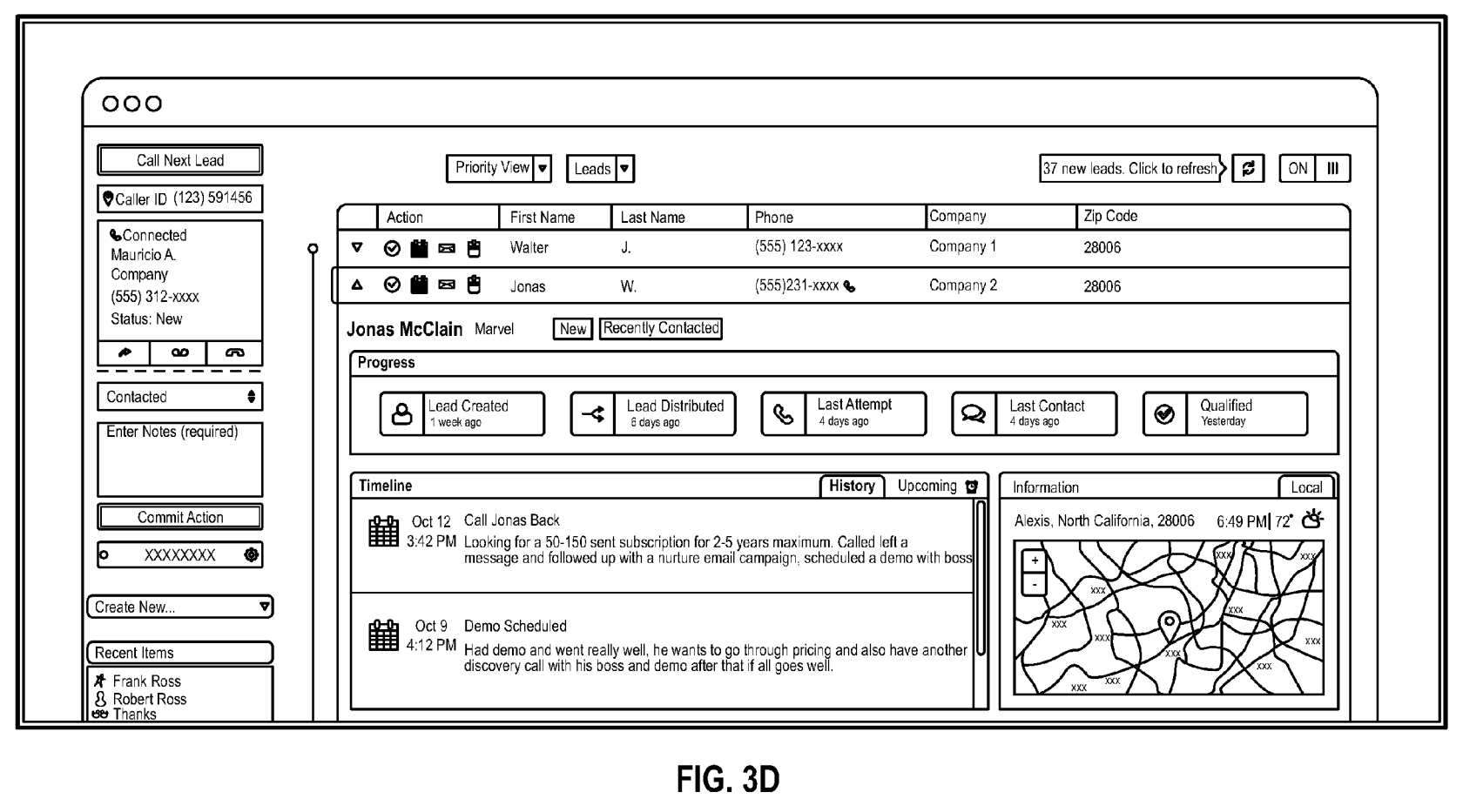

FIG. 3D illustrates another interactive user interface that may be displayed to a user in order to provide further details regarding a particular call target (lead). In this embodiment, the call information is in the left-hand pane, and detailed information regarding a particular lead is in the right-hand pane. In this example, the interactive user interface advantageously includes a timeline of key statuses of the particular call target that allows the user to easily track history and progress of the call target. For example, the user interface indicates a time since the lead was created, time since the lead was distributed, time since last attempt of contacting the lead, time since last contact with the lead, and current status of the lead (e.g., "Qualified" in the illustrated example). This particular interactive user interface also includes detailed information regarding contacts, and contact attempts, with the lead target, as well as location information associated with the call target. In some embodiments, the location information may be obtained in the same or similar manner as discussed herein with reference to obtaining geographic information regarding a target for use in selection of a geographically based caller ID number.

Returning to FIG. 3A, beginning in block 310 the system may determine if a target is associated with a custom caller ID. In this example embodiment, a custom caller ID is the preferred caller identification used. The custom caller ID may be specific to an individual call target. For instance, individuals that have a very high chance of conversion, contact, or other desirable outcome may be assigned a custom caller ID. For example, if a particular target indicated a desire to buy a product immediately, a custom number may be assigned to that target such that any communication with the target is quickly identified by source to the target, and incoming calls from the target are recognized by the system as being assigned to the target, even if from an unknown number, and are routed to an appropriate agent immediately. In some embodiments, the custom caller ID may be selected and assigned to the target based on a set of rules. For example, the custom caller ID may be selected to convey specific information about a campaign associated with the target such that the outbound caller ID matches a specific number recognizable to the call target. As an example, a university may select custom caller IDs for potential students that may be interested in a specific college or program within the school. The custom caller ID thus conveys additional information specific to the high value target. Furthermore, if the target calls back to the custom caller ID number, the call can be routed to a particular assigned agent or an agent with experience dealing with the specific products or services associated with the custom caller ID, such that the maximum value of the lead is realized by the system. If in block 310, the system determines that the call target has an associated custom caller ID, the system may then select the custom caller ID telephone number in block 315 for use when initiating a call with the call target. If the system does not identify a custom caller ID associated with the call target, it may move on to block 320 to see if there is another preferred caller ID associated with the call target.

In block 320, the system may determine if the call target is associated with a campaign that uses one or more specific caller ID telephone numbers. In some embodiments, a campaign caller ID may be used to associate a call target with a number that corresponds to a specific campaign. For example, a company may have an online campaign which generates a set of targets. Each target in the set of targets may be called with an outbound number corresponding to the campaign. This enables the target to recognize the number from the initial campaign as well as enabling inbound calls to the campaign caller ID to be efficiently routed to an appropriate agent associated with the specific target or with experience with the specific campaign associated with the number. If the system identifies an associated campaign in block 320, the system may select a number (or name of entity making or requesting the call) associated with the campaign for use when initiating calls to the call target in block 325. If the system does not identify an associated campaign, the method moves to block 330.

In some embodiments, the system may provide a local caller ID as the outbound number if no custom or campaign caller identification is available (or based on other rules or hierarchal preferences of an entity). For example, in block 330, the system may determine if the call originator has decided to contact the target with a local telephone number and/or if the target has associated geographic information. If the system determines that a local caller ID number is appropriate, the system may determine if a geographic location of the target is available in block 335. If geographic information corresponding to the target is available, the system may select an outbound telephone number corresponding to the target's location in block 347. For example, a database storing information about the target may have data about one or more mailing addresses, home addresses, or billing addresses. The system may select an outbound telephone number that appears to have a physical location corresponding to the target's location. If the system cannot access geographic information about the target in block 335, it may instead select a telephone number that appears to be in the same or similar location as the target's telephone number. Example methods of selecting an appropriate outbound number based on geographic data is described further below with reference to FIG. 4.

In some embodiments, if the system determines that setting a local caller ID is not enabled by the system, or a local caller ID number is not available in block 330, the system may determine in block 345 if the call is being made by or on behalf of an entity with one or more specific telephone numbers. For example, in some embodiments, a company will use one or more outbound numbers for making calls to call targets. If the call originator is calling from the company or on behalf of the company, the system may select a telephone number (or alphanumeric indicator of the company) corresponding to the company's outbound telephone numbers. Therefore, in some embodiments, such as where calling targets is outsourced to a third party, the third party may use different outbound caller IDs based on which company the agent is calling on behalf of. If the system determines that the call is initiated for an entity with a specific caller ID, the system may select a caller ID associated with the company in block 350.

In block 355, if another telephone number has not been selected by the system, the system may determine if the call originator has defined another telephone number to use for the caller ID. For example, the call originator may select an outbound number from a pool of available numbers. In some embodiments, these numbers may also be used as other types of caller IDs for other targets. For example, the call originator may select a telephone number as a call originator defined caller ID that is also used as a local caller ID for one or more other call targets. If the system determines that a telephone number was defined by the call originator, it may be selected for use when initiating a call in block 360.

In some embodiments, the caller identification management system may select a default phone number in block 365 to use if another number is not selected. For example, a default number may be the actual phone number of the device that the call originator (e.g., call agent) is (or will be) using for the call. In some embodiments, each agent may have a specific phone number which can be used as a default if no other number is available or preferable. In some embodiments, a single caller ID may be used as the default for all call originators making outbound calls from a specific location, for example, from a single call center or company.

Although shown in FIG. 3A as a hierarchy with caller ID information selected based on one of a set of criteria, in some embodiments, the selection criteria may be used in conjunction with one another. For example, a campaign may have multiple telephone numbers associated with it, so the system may select a telephone number associated with the campaign that is also in closest proximity to a geographic location associated with the target. Thus, the system may select a preferred number within a set of numbers available based on a criteria highest in the hierarchy by also applying other selection criteria. The method the system used to select specific caller ID information, such as via a caller ID information hierarchy or ruleset, may be personalized or customized for specific campaigns, customers, or products and/or based on machine learning applied to previous call attempts.

Geographic Caller Identification Selection

FIG. 4 depicts processes that may be performed by a system to select caller ID information for of an outbound telephone call based on geographic information associated with the call target. For example, these processes may be performed as part of processes discussed with reference to blocks 335, 340, and/or 347 of FIG. 3A. Depending on the embodiment, the method of FIG. 4 may include fewer or additional blocks and the blocks may be performed in an order that is different than illustrated.

In some embodiments, geographic regions or locations may be defined by the system in a variety of ways. For example, the system may base the geographic locations at least in part based on boundaries of cities, ZIP codes, ZIP+4 codes, area codes, county lines, state lines, metropolitan areas, and/or the like. In some embodiments, the system may define all geographic areas based on the same type of boundaries, or they may be based on different boundaries depending on the available data. For example, in rural areas, county lines or area codes may define boundaries, whereas, in cities or urban centers, neighborhoods or zip codes may provide the boundaries of geographic areas. Depending on the embodiment, the method of FIG. 4 may include fewer or additional blocks and/or the blocks may be performed in order different than as illustrated.

Beginning in block 405, the system may identify contact and other information known about a call target. In some embodiments, the system may accesses information known about the call target from a call target database. For instance, a database accessed by the system may include information that targets enter into web forms associated with the call originator. In some embodiments, some of the targets may have information about their geographic location already stored in the database, which the caller identification management system can correlate to telephone numbers close to the call target. Call target information may be obtained from a CRM system, such as those that generated the user interfaces of FIGS. 3B-3D and which store information regarding a plurality of potential call targets.

In block 410, the system may analyze the extracted contact information to check if contact information associated with the target includes any geographic marker(s), such as residence address or work address. If the information includes one or more geographic marker, the system may proceed to determine a region as supported by the system that includes the identified geographic marker(s). If multiple geographic markers are indicated, such as multiple physical addresses, other rules may be applied to determine a geographic marker for use in determine caller ID information using the process described below. For example, an address that has been most recently added to the database may be used as the basis for the geographic marker.

In some embodiments, if the contact information does not include a geographic marker, the system may attempt to determine a location for the target. Continuing to block 415, the system may access a third party database, such as census data, to attempt to identify a geographic marker for the call target. For example, the system may take known information about the target and compare it to information in a third party database to determine a geographic location most likely associated with the target. For example, contact information known about the call target may include a combination of name, age, telephone number, employment or other information which may be used to query a third party database to access additional information about the target. For example, name, age, and telephone number of a target may be used to query one or more databases, such as census data, to obtain information regarding the target that can be linked to a geographic marker.

In some embodiments, in addition to, or as an alternative to, accessing a third party database, the system may analyze addition information provided by the target to determine a relevant geographic location. For example, an employer, educational institution, or other background information associated with the target is available (such as may be provided by the target or obtained from another source), the system may access address information of the employer, school, or other entity and derive a possible location or set of locations from the background information by selecting a correlated geographic location. Even if the target does not currently reside in the geographic location of a previous employer or school, the target may be more likely to respond than if a random, blocked, or toll free number was used. In some embodiments, the system may also determine a geographic marker for a target based on IP address data from the device that completed a web form that originally identified the target, such as a web form that the target filled out requesting information regarding a product offered by the call originator.

In block 420 the system may determine if a geographic marker has been identified. If a geographic marker has been identified, the system may continue to select a telephone based on the geographic marker. If the system has been unable to determine geographic marker for the target based on the provided data, the system may continue to block 425 and use the target telephone number to determine a geographic region for the call target. For example, the area code of the telephone number of the call target may be associated with a specific geographic region. The system may then set the call target's location as in that region for selecting an outbound telephone number for contacting the call target. In some embodiments, the system may attempt to determine potential geographic markers for a target by a variety of processes and select a most likely geographic marker based on the results.

In some embodiments, one or more geographic markers (e.g., determined at blocks 410 and/or block 425) may be sued to estimate demographic information regarding a call target. For example, a geographic marker for a call target, such as a residence ZIP code, may be used to query public census data in order to return information regarding whether the address is likely associated with a commercial or a residential location. If the location is commercial, the caller ID selection component 160 may use a caller ID in that same geographic location for the outbound call, while if the location is residential, the caller ID selection component 160 may attempt to select a caller ID based on other information (such as the other aspects of FIG. 4). In other embodiments, a residential location triggers use of a caller ID from the same geographic location.

In some embodiments, a determination of various demographic features may be determined based on the geographic marker, such as household income, ethnic makeup, etc. In some embodiments, such demographic information may only be determined if the geographic marker is associated with a residential location. Furthermore, one or more databases correlating surnames (and/or first names) of call targets to ethnic backgrounds may be accessed, potentially along with information from public census data and/or other data, to predict an ethnicity of the call target. Such information may then be used to select a caller ID for the call target. For example, if the call target is determined to be of Chinese descent (based on census demographics and/or name analysis), the caller ID selection component may impose a filter on caller ID numbers that are selectable for the target so that the numbers "4" and "7" are not included in the selected number (as some Chinese may feel that the numbers 4 and 7 are unlucky or even associated with death and likely wouldn't answer a call from a number with many, or even 1, four). However, such Chinese descent call targets may be more likely to answer a call if the caller ID includes the number "3", which may be considered a lucky number. Thus, a Chinese descent filter may be applied to those call targets that are likely Chinese indicating that the caller ID should not include any "4" s, but should include as many "3" s as possible. Other similar cultural, religious, or belief based filters may be applied based on determined demographic information about the call target. For example, for call target's in Kenya, caller ID numbers with the last digit of "7" may be excluded from selection, since that may be seen as unlucky; "13" and "666" may be excluded in many countries as being unlucky number; while "4" is consider unlucky in China, "4" may be seen as lucky in Europe, North America, and Australia, for example, and used in caller ID numbers selected for calls to those regions as much as possible. Thus, through use of a cultural number selection algorithm, numbers that are selected by the caller ID selection component may be filtered and/or preferences for numbers to include in selected numbers may be provided. In some embodiments, numerical filters and/or recommendations may be used in selection of caller ID numbers any caller ID selection method. Additionally, in some embodiments, such a cultural number selection algorithm may be used in determining telephone number to purchase (e.g., numbers with more "lucky" numbers) and/or decommissioned (e.g., numbers with more "unlucky" numbers) by the caller ID resource manager 174, as discussed above.

In some embodiments, the system continues to block 430 after a geographic marker has been provided, to determine a particular geographic region for the target. For example, if the geographic marker for a user is a street address, the system may assign a neighborhood, township, or other regional area as the geographic region for the target. In some embodiments, the geographic region may include a zip code, for example, the system may then access a database which maps the zip code to a geographic region used by the system. For example, the database may include zip codes, area codes, cities, counties, or other geographic markers and have them mapped to geographic regions as used by the system. In some embodiments, the geographic regions used by the system may be defined as specific zip codes, area codes, cities, counties and may include a database correlating geographic markers determined for targets to the geographic regions used by the system. In some embodiments, the geographic markers may be correlated to specific geographic regions by a third party system. For example, a street address may be provided to a third party system to determine an appropriate zip code.

Moving on to block 435, after the system has determined a geographic region for the target, the system may access a database of available caller ID numbers to include with an outbound call, each of which is correlated to one or more geographic regions. For example the database may include a set of geographic regions used by the system and associated telephone numbers currently available for use. In some embodiments, a database containing available telephone numbers may be the same as a database used to determine a geographic region based on a geographic marker. In some embodiments, the system may determine multiple geographic regions for the call target. For example, if the contact information includes multiple geographic markers the system may assign the call target to geographic regions associated with each marker. This may happen for instance, if the call target moved, but keeps a cell phone number associated with a previous residence location. In such situations, the system may assign a primary geographic region based on the address provided by the call target, but may assign a secondary geographic location based on the target's telephone number. In some embodiments, the system may use the secondary geographic region if there are no available telephone numbers associated with the primary geographic region. In some embodiments, additional geographic regions may also be associated with a single call target.

Moving on to block 440, the system may determine if the database telephone numbers available that correspond to the geographic region of the target (including numbers that fit any demographic or culture filters that may have been determined for a particular call target). In some embodiments, the system may not have a caller ID number available in all geographic regions or may have multiple available caller ID numbers available for one or more regions. If the system determines that there is a number available for a region corresponding to the target's geographic region, the system determines a set of numbers corresponding to that region in block 445. The set may include all numbers available for a specific geographic region or a subset of those numbers. For example, some numbers available for use by the system in the geographic region may not be available for use with the specific call target. The call target may not be associated with a campaign that exclusively uses some of the available numbers, for instance.

If there is no number for the geographic region associated with the call target, the system may continue to block 450 to determine if a nearby geographic region has any available numbers. Nearby regions may be determined as those regions adjacent to the region determined for the target, by a distance from the nearby regions to the target's region, or by other means. In some embodiments, the geographic regions may be stored with an indication of regions to include as nearby regions. If one or more nearby regions include an available telephone number, the system may determine a set of available numbers for the nearby regions in the same manner as if there were available numbers in the target's geographic region in block 455.

Moving on to block 460, if there is no available number for the target's region or for nearby regions, the system may select another set of available numbers. In some embodiments, the other set of available numbers may be selected as those available in a region determined as a secondary region for the target, or numbers that do not match the determined demographic and/or cultural number filters. In some embodiments, the system may select a number randomly from a predefined set of numbers, a set of default numbers used when local data is not available, or in another manner. In some embodiments, if a local number is not available for the call target's region or a nearby region, the system may proceed to a next preferred caller identification type. For example, the system may proceed to determine whether a company caller ID type is appropriate for the call target, as outlined in FIG. 3A.

Moving on to block 465, in some embodiments, the system may select a particular number to set as an outbound caller ID if the system identified multiple candidate numbers at block 445, 455, or 460. In some embodiments, the system may keep statistics associated with available numbers which may be used to select a preferred telephone number from the set of available numbers. For example, the system may attempt to use the telephone numbers available at an even level to help redistribute calls returned to the system. Furthermore, a particular telephone number may receive responses at a higher or lower rate than other available numbers and may be preferred or avoided in response. For example, the system may use machine learning or artificial intelligence techniques to determine which of a subset of available numbers has the best chance of resulting in a completed telephone call with the particular call target. For example, in a given region one area code or prefix may be perceived to be from a better area of town and therefore receive a higher response rate than other numbers. The system may use this response rate to optimize the selection of telephone numbers.

In some embodiments, the system may select a candidate number from the set of numbers based on determining that the one of the numbers meets criteria for another selection process. For example, if one number in a set of candidate numbers is also associated with a campaign that is relevant to the call target, that number may be selected ahead of other numbers. In some embodiments, the system may select a number based on the frequency that number has been used compared to other numbers. For example, selecting a number that has been used more often may provide the advantage of having more targets associated with a single number if some numbers are later released by the system. Selecting a number which has been used less frequently than other numbers may provide an advantage for routing incoming calls to that number. In some other embodiments, the system may select a particular number from a set of candidate numbers randomly. After the system selects a particular telephone number to use as the caller ID for a target in block 465, the system may set the selected telephone number as the caller ID in block 470.

In some embodiments, the system or a call originator may contact a particular target multiple times. In some situations, the target may provide more information after an initial contact, but before a subsequent contact, which clarifies the geographic location of the target. In some embodiments, the caller identification system may update the geographic location in the target's information, but may continue to use the previously determined local caller identification number for calling the target so that a consistently recognizable number is provided to the target. In some other embodiments, a new local caller identification number may be determined after additional geographic information has been determined about the target. In addition, in some embodiments, after an initial call is made to a target, the same number will be used to contact the target on any future occasions. However, the system may also allow an agent or administrator to change the number that will be used to contact the target. For example, after the initial contact, an agent may assign a custom number to a target, or may assign a personal number of the agent for use by the target.

In some embodiments, caller ID information on incoming calls may be analyzed before routing the call in/or creating a new lead or a call if the call and/or lead are not matched with an existing. For example, if an individual calls a number provided by the target management system 100 in caller ID information from a previous call to the target, the target management system 100 and/or a CRM lead management system may try to match the incoming call to an existing lead record and, if no match is found, create a new lead record. In some embodiments, the incoming phone number used by the target is compared to caller ID numbers that have been sent out by the target management system 100, perhaps in a predetermined time (e.g., one month, three months, one year) or at any time, in order to determine if the target previously received a call using that incoming phone number or if the target misdialed another phone number and happen to use that incoming phone number. In some embodiments, if the incoming phone number does not match a caller ID number that is known to have been used by the target management system 100 (or provided to one or more of several possible calling entities that receive caller ID information from the target management system 100), a new lead record may not be created for the caller. Rather, the call may be blocked, the message may be provided to the caller indicating that they are calling the wrong number, or some other message that is developed in view of the call being a likely erroneous call that may not be related to the caller ID number within the target management system 100.

Predictive Caller Identification Setting

Figure 5:
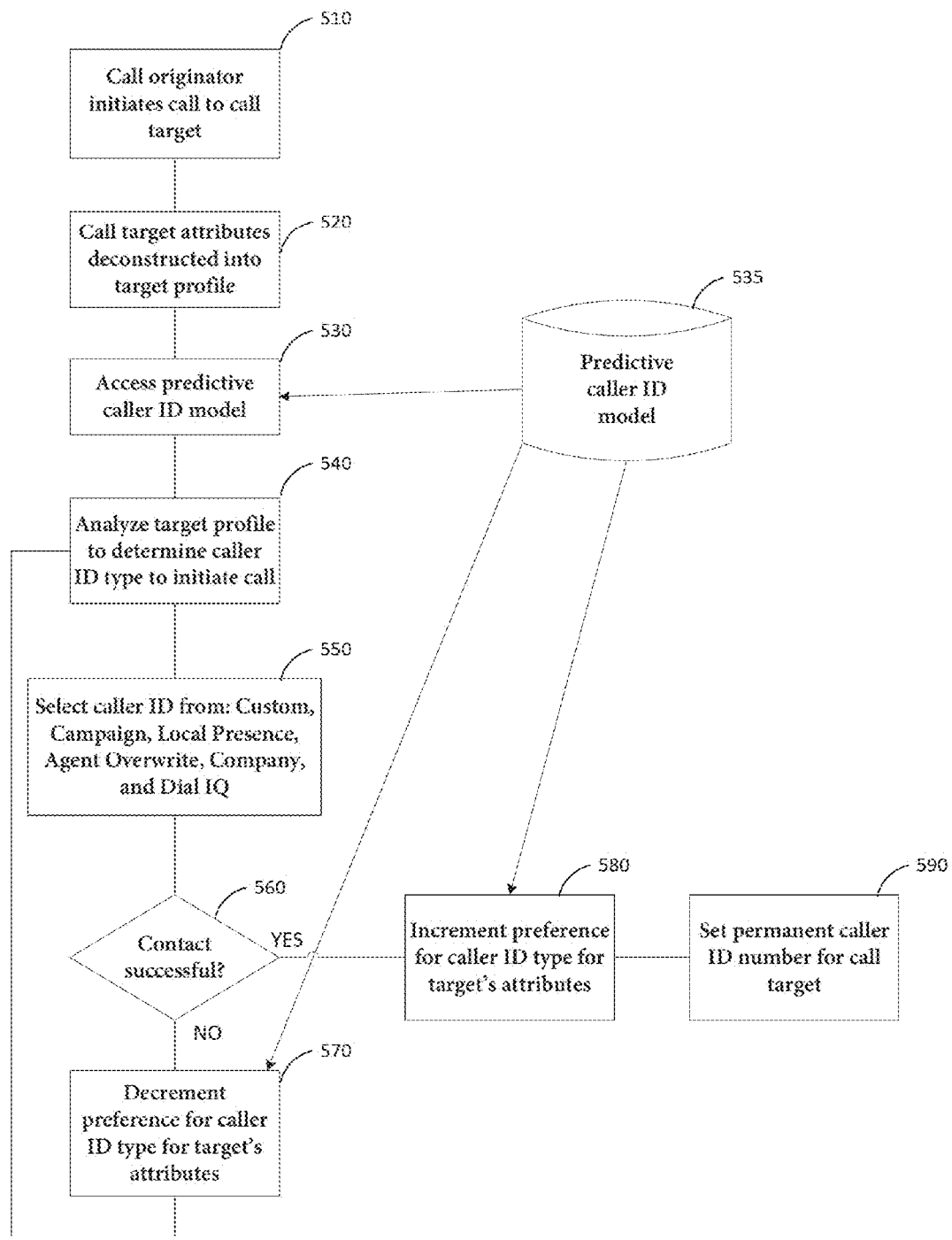
FIG. 5 depicts a flow diagram illustrating processes for predicting a caller ID with the greatest likelihood of success.

FIG. 5 is a flowchart depicting an embodiment of processes for predicting an optimum caller ID to use in attempting to contact a target. The processes illustrated in FIG. 5 may operate as an alternative to or supplemental to those discussed with reference to FIGS. 3-4. Depending on the embodiment, the method of FIG. 5 may include fewer or additional blocks and the blocks may be performed in an order that is different than illustrated.

Beginning in block 510, a call originator initiates a call to a call target. For example, the call may be originated in any manner as discussed above or in another manner.

Moving on to block 520, a profile associated with the target is accessed, generated, and/or updated with information and attributes associated with the target. The profile may be generated such that it is efficiently and accurately analyzed to provide the best predicted caller ID. For example, attributes such as estimated income may be converted into binary values indicating a range of income into which an individual estimate falls. Similar segmenting of call targets into segments associated with various ranges of attribute values may be performed, such as by deconstructing the profile of the call target to determine other attributes such as age, address, marital status, education level, employments, etc. In some embodiments, the generated profile may then be represented as an array of binary values, each indicating whether the target has a specified attributes, such as indications of which demographic or psychographic segments the profile is associated with. In some embodiments, non-binary values may be used for particular attributes. For example, the targets age may be used instead of segmenting the target into an age range. In some embodiments, an actual value is used instead of (or in addition to) segments for those attributes indicating a particular caller ID predictably as the value increases or decreases. In some embodiments, the attributes of a target are deconstructed before a call originator initiates a call. However, in order to use the most up to date information, which may be modified over time, in some embodiments the target may be deconstructed into a profile just as the call is occurring.

Moving on to block 530 the system accesses a predictive caller ID model. For example, the predictive caller ID model may be stored in a predictive caller ID model database 535. In some embodiments, there may be more than one predictive caller ID model. For example, there may be multiple models based on the vertical that is being used, based on the particular call originator, based on temporal restrictions, or based on other attributes of the particular call. In some embodiments, each of these attributes may be built directly into a single model.

Moving on to block 540, the system analyzes a profile associated with the target to determine a caller ID type to use with the newly initiated call. For example, the profile associated with the target may include one or more attributes such as: name, street address, city, state, ZIP, age, gender, credit score, income, household income, expenses, debts, assets, product or service of interest, organizational budget, spending authority level of the individual, purchase decision timeframe, previous purchase history, electronic and telephonic interaction history, associated campaigns, associated products, previous contact attempts, or any other attribute which provides information about the lead. In some embodiments, the system may also take into account one or more attributes of the call originator as well.

In some embodiments the predictive caller ID model used to analyze the caller profile may have weightings for various potential attributes of profiles. Based on the weightings of the attributes and the value for a particular profile, a score may be generated for each available type of caller ID and a particular type of caller ID may be selected based on the scores. For example, the system may store a specific weighting for each potential attribute associated with each type of caller ID. The system may then aggregate the value of the weightings after they are applied to each of the attributes in the target profile for each of the caller ID types. Whichever type of caller ID has the highest score is chosen by the system as the preferred caller ID for the target.

Moving on to block 550, the system selects a caller ID for the initiated call based on the analysis of the profile. For example, a specific caller ID associated with the type of caller ID returned by the profile analysis performed according to the predictive caller ID model may be selected. In some embodiments, the caller ID may be selected as discussed above with reference to FIGS. 3 and 4. In other embodiments, the predictive caller ID model provides criteria for selection of a caller ID number for a particular call target that doesn't align with any one particular caller ID selection method. Thus, the caller ID selected for the call target may be selected based on other criteria and/or rules than those associated with the several caller ID types discussed herein.

Moving on to block 560, the system determines if a contact attempt using the selected caller ID to the call target was successful. If the contact attempt was not successful, the system may move on to block 570 and decrement the preference weighting for the caller ID type associated with each of the attributes of the target profile in the predictive model. In some embodiments, a contact attempt may be considered successful if the target answered the call, stayed on the line for a particular length of time, progressed to the next stage of a sales cycle, converted eventually, or met another criteria indicating the quality of the call. For example, if the profile had an attribute of estimated income in a specific range and the contact number being a cellular number, the system may decrease the weighting associated with each of those attributes for the type of caller ID used. After the model is updated the system may return to analyze the target profile again to determine a caller ID. On a second pass, the caller ID type that was previously unsuccessful may not be available as a possible caller ID type. In some embodiments, only the first contact attempt is analyzed for purposes of updating a predictive model. This may prevent a target that is unlikely to answer any call from adversely affecting the caller ID selection models.

On the other hand, if the contact attempt was successful the system may instead move onto block 580 and increment the preference weighting for the caller ID type associated with each of the attributes of the target profile in the predictive model. For example, if the profile had an attribute of a specified region and a particular vertical, the system may increase the weighting associated with each of those attributes for the type of caller ID used. If the contact was successful, the system may move on to block 590 and set the permanent caller ID for the call target to the number that was successful.

Figure 6:
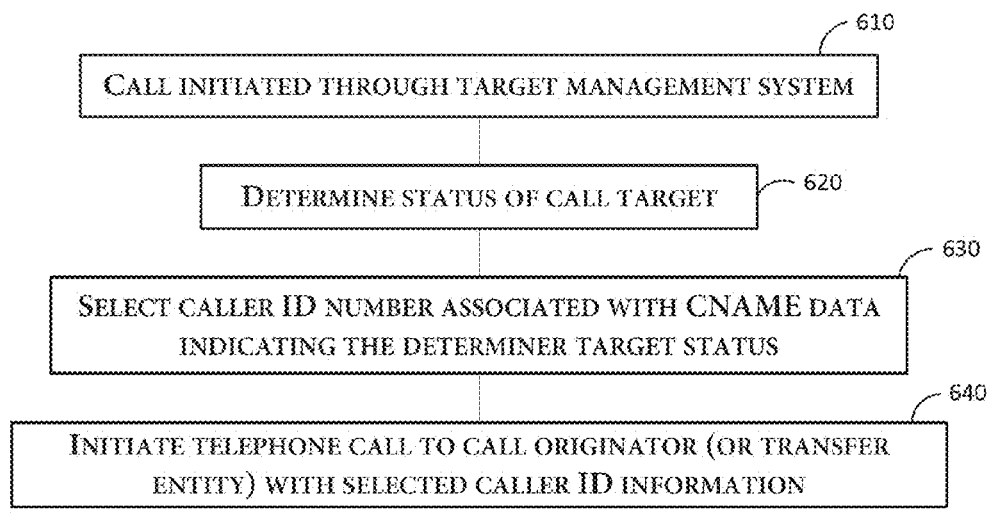
FIG. 6 depicts a flow diagram illustrating processes for selecting a caller ID with an appropriate CNAM to display to a call originator

Example Customization of Caller ID Information for a Call Originator or Transfer Entity FIG. 6 is a flowchart illustrating an embodiment of processes for determining a caller ID for presentation to a call originator. In some embodiments, the processes illustrated in FIG. 6 may take advantage of CNAM setting put into place previously by the target management system. For example, as discussed with reference to FIG. 1A above. Depending on the embodiment, the method of FIG. 6 may include fewer or additional blocks and the blocks may be performed in an order that is different than illustrated.

Beginning in block 610, a call is initiated or transferred through the target management system. For example, a call originator may make a call through the system to the next call target in a prioritized list. In certain situations, an inbound call may be initiated through from a target through the system and may be routed to one or more call originators. In some embodiments, the system may also perform the blocks in FIG. 6 when a call is transferred from a call originator to a transfer entity.

Moving on to block 620, the system determines a status of the call target. The status of the call target may determine the manner in which the call originator would deal with a target. For example, calls for some targets may be important to answer the call immediately, while others may be fine to call back at another time or not answer at all. In some embodiments, the status of a call target may be one or more of:

an "inbound call" representing a call received from a call target;

a "scheduled dial" representing a call that was scheduled with a call target at a specific time;

a "call-back" representing a call received from a call target as a return call to a previous call;

a "distribution target" representing a call that is presented to multiple call originators at the same time with the target provided to the first to answer;

an "outbound call" representing a call made through the call originator's system;

a "transferred target" representing a call that is transferred from another call originator;

a "hot target" representing a call associated with a target that is likely of high value;

a "company target" representing a call that is made to a number associated with a specified company; or a "campaign target" representing a call that is made to a number associated with a specified campaign.

Thus, in some embodiments caller ID numbers may be separately set aside for use with the various call statuses above. In some embodiments, there may be fewer or additional options for statuses a call target may have. The status of the call may be determined based on one or more identifiers of the call target. For example, a "hot target" may be identified by an inbound number known to be associated with the particular target that is identified as having high value. The system may set some statuses through the call initiation process based on a call made by the originator. For example, an outbound call may be indicated as such when the originator's telephone system rings. In certain situations, a call target may be associated with more than one status. In such situations the system may identify the target as each of the statuses, or may select one of the statuses to use for the target. For example, one of multiple statuses for a target may be selected from a hierarchy, randomly, or may be selected in another manner. In some embodiment, the call originator selects the caller ID number and/or caller ID type to use when contacting the transfer target. For example, the call originator my select, as part of the CRM system that interfaces with the call management component 145, a particular caller ID that is known to indicate a status of a call target. For example. If a call target is a "hot target", the call originator may select an indicator within the software of such, and the call management component 145 can then selected a caller ID number associated with "hot target" to send to the transfer target so that the call targets status is known from the caller ID information.

Moving on to block 630, in some embodiments the system selects a caller ID number associated with CNAM data corresponding to the determined status. For example, each of the statuses that may be associated with a call target may be associated with one or more telephone numbers in a caller ID database. The specific caller IDs associated with a status may have CNAM data including alphanumeric information associated with the status. The CNAM data may be the same as the specified status, for instance. In some embodiments, the system may have one or more numbers which represent combinations of statuses. For example, one number may be associated with a target that has a status of "call-back" and "hot target." The CNAM data associated with the number may have an indication of both in the textual information, such as "hot call-back." In some embodiments, CNAM data may be customized to show specific agent, such as a call originator that is transferring a call. Thus, the transfer entity may immediately know from whom a call is being transferred and may initiate the conversation appropriately. Similarly, CNAM data can be set to indicate a department, e.g., cold calls or dispute resolution center, so that the transfer entity has more information on the nature of the transferred call. In some embodiments, the amount of textual information that may be included in CNAM data may be limited to a specified number of characters, such as 15 characters.

Moving on to block 640, the target management system initiates a call with the call originator (or transfer entity in the cases of a transfer from an original call originator) with the selected caller ID number. The call originator then will receive a call with that number and the associated telephone or computer systems can request CNAM data from a CNAM database or lookup service. The returned CNAM data will indicate the status of the call target.

As an example of the processes depicted in FIG. 6, a "scheduled dial" may be initiated by the target management system at a time specified by the call originator to a specified target. The system then determines that the status of the call target is a scheduled dial. In certain situations, the call target may also be associated with another status, but the system may determine a particular status for the call as a "scheduled dial." The system may then select a caller ID number from the caller ID database that is associated with the status of "scheduled dial." When the call is initiated, the system may first initiate the call to the call originator using a number associated with "scheduled dial." At that point, the originator's telephone system may issue a request to a CNAM database for the CNAM data associated with the selected caller ID number. The CNAM database can then return the CNAM data associated with the caller ID number to provide information to the call originator. For example the call originator's telephone may display text indicating that the call is a "scheduled dial" based on looking up the telephone number (e.g., the CNAM data may be "Scheduled Dial". As discussed above, the system may then, after the originator answers and the call proceeds to a stage where transfer to a transfer entity is appropriate, proceed to initiate a second leg of the call by transferring the call to a transfer entity with updated caller ID information, such as updated CNAM data to indicate a current status of the call target and/or sales process, for example.

Example Target Management Platform

Figure 7:
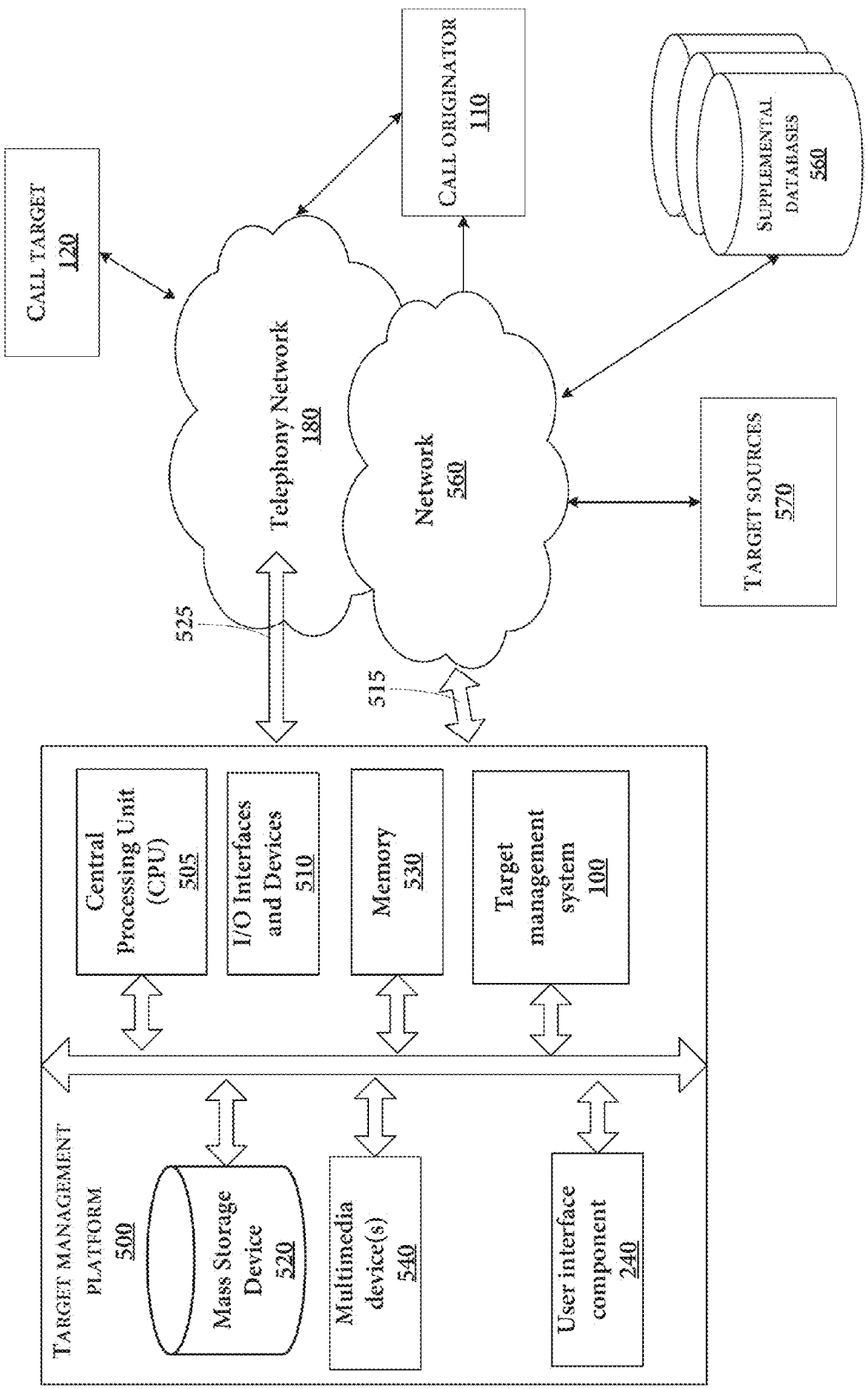
FIG. 7 depicts a block diagram showing one embodiment of a target management system within a network, such as a computer and/or telephony network

FIG. 7 is a block diagram showing one embodiment of a target management platform 500 that may be used to implement some or all of the functionality described herein, such as with reference to the target management system 100. The illustrated target management platform 500 comprises a computing system for setting or modifying caller ID information on outbound calls (the target management platform 500 may be referred to herein simply as "computing system 500"), that utilizes a communication link 515, to electronically communicate over a network 560 with one or more call originators 110, a set of supplemental databases 560, and target sources 570. The computing system also initiates communications between a call targets 120 and call originator 110 over a telephony network 180 utilizing a communication link 525. The computing system 500 includes a central processing unit (CPU) 505, input/output (I/O) devices and interfaces 510, a mass storage device 520, a memory 530, multimedia devices 540, and target management system 100. Depending on the embodiment, the platform 500 may include fewer or additional components and/or the components may be distributed among multiple computing devices in various combinations.

The system 100 communicates with target sources 570 to identify targets for initiating phone calls. In some embodiments, the target sources 570 may include a target database which includes data entered or discovered about various targets, for example, the target database 145 described in reference to FIG. 1A above. In some embodiments, the target sources 570 may include one or more third party referral sources, web forms providing information regarding target information received from call targets, or other sources. In some embodiments, the target data received from target sources 570 may be used to populate a target database 145 as described in reference to FIG. 1A. The target management platform may also communicate with various physical data stores, such as supplemental databases 560, which may include additional information about call targets, telephone numbers, geographic data, or other information useful to the target management system 100.

In some embodiments, one or more of the databases may be implemented using a relational database, such as Sybase, Oracle, CodeBase, and Microsoft® SQL Server, as well as other types of databases such as, for example, a flat file database, an entity-relationship database, and object-oriented database, a distributed file system, and/or a record-based database. The call originator 110 may request a call to be initiated by the target management system 100. Based on receiving the request to initiate a call, the system may identify a telephone number to use for setting caller ID information and may initiate a call through telephony network 180.

The computing system 500 includes the target management system 100 that, in one embodiment, is stored in the mass storage device 510 as executable software codes that are executed by the CPU 505. The target management system 100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 7, the computing system 500 is configured to execute the target management system 100 in order to, for example, initiate contact with call targets 120 as requested by call originators 110 with caller ID information set to telephone numbers selected to optimize the response of the call targets 120. The target management system 100 may also provide one or more of the features discussed above, including identifying a next target to call, analyzing a target, identifying geographic regions for a target, initiating calls, setting caller ID information, and/or modifying telephone calls. In some embodiments, the computing system 500 illustrated in FIG. 7 may include fewer or additional components. For example, the computing system 500 may include a separate caller ID management component, or may not include multimedia devices 540. In some embodiments, the computing system 500 may include one or more call originator systems 110 as well as target management system 100, which may themselves include any combination of the components illustrated in platform 500. In some embodiments, the computing system 500 may be part of call originator systems 110.

The telephony systems 180 may be a public switched telephone network which connects the call target 120 to the call originator 110. The call originator 110, may comprise computer systems configured to enable the call originator 110 to request calls to be initiated by the target management system 100. In some embodiments the call originator system may comprise a session initiation protocol terminal configured to handle calls initiated by the target management system 100. In some embodiments, the call originator 110 system directs calls over a network, such as the internet, through a voice over IP connection. In some embodiments, the call originator places communicates with the call target 120 through the telephony network 180 using the same interface that requests calls to be initiated by the target management system 100. In some embodiments, the call originator may also communicate with the telephony network 180 through a primary rate interface system.

In some embodiments, the target management system 100 may initiate a telephone call to a call target 120 by invoking a call from an external telephone system of the call originator 110, such as a voice over IP (VOIP), cell phone, or landline. For example, call information may be transferred to the external telephone (e.g., a VOIP phone) from the target management system 100 (or the communication interface 114), which then initiates the call to the call target 120 using the call information (e.g., including a call originator number included in the received call information). Thus, in one embodiment the target management system 100 can output information that controls functionality of an external telephone device.

In some embodiments, the call originator 110 may have various external telephone systems, which may be set to ring based on the location of the call originator at the time a call is initiated. In some embodiments, multiple, or all, telephone systems associated with the call originator 110 may be contacted simultaneously as the system initiates a telephone call. In some embodiments the target management platform 500 is operated on the call originator 100 systems and the call originators connection to the telephony network 180 may initiate calls to the call target 120.

Example Computing System

The computing system 500 may include one or more computing devices, for example, a personal computer that is IBM, Macintosh, or Linux/Unix compatible or a server or workstation. In one embodiment, the computing system 500 comprises a server, for example. In one embodiment, the exemplary computing system 500 includes one or more CPU 205, which may each include a conventional or proprietary microprocessor. The computing system 500 further includes one or more memory 530, such as random access memory ("RAM") for temporary storage of information, one or more read only memory ("ROM") for permanent storage of information, and one or more mass storage device 520, such as a hard drive, diskette, solid state drive, or optical media storage device. Typically, the modules and/or components of the computing system 500 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 500 may be combined into fewer components and modules or further separated into additional components and modules.

The computing system 500 is generally controlled and coordinated by operating system software, such as Windows XP, Windows Vista, Windows 7, Windows 8, Windows 10, Windows Server, Unix, Linux, SunOS, Solaris, iOS, Blackberry OS, Android, or other compatible operating systems. In Macintosh systems, the operating system may be any available operating system, such as MAC OS X. In other embodiments, the computing system 200 may be controlled by a proprietary operating system. Conventional operating systems control and schedule computer processes for execution, perform memory management, provide file system, networking, I/O services, and provide a user interface, such as a graphical user interface ("GUI"), among other things. To implement the computing system 500 and/or one or more of its components, various software including Perl, Syncsort DMExpress, MySQL, InfoBright, Veritca, DB2 Connect, Connect Direct, MapR M5 Hadoop, and/or Tableau can be utilized.

The exemplary computing system 500 may include one or more commonly available I/O devices and interfaces 510, such as a keyboard, mouse, touchpad, and printer. In one embodiment, the I/O devices and interfaces 510 include one or more display devices, such as a monitor, that allows the visual presentation of data to a user. More particularly, a display device provides for the presentation of GUIs, application software data, and multimedia presentations, for example. The computing system 500 may also include one or more multimedia devices 540, such as speakers, video cards, graphics accelerators, and microphones, for example. In some embodiments, I/O interfaces and devices 510 may be included on call originator 110 systems.

In the embodiment of FIG. 7, the I/O devices and interfaces 510 provide a communication interface to various external devices. In the embodiment of FIG. 7, the computing system 500 is electronically coupled to a network 560, which comprises one or more of a LAN, WAN, and/or the Internet, for example, via a wired, wireless, or combination of wired and wireless, communication link 515. The network 560 communicates with various computing devices and/or other electronic devices via wired or wireless communication links.

In general, the word "module" (also referred to herein as a "component") as used herein, refers to logic embodied in hardware or firmware, or to a collection of software instructions, possibly having entry and exit points, written in a programming language, such as, for example, Java, Lua, C and/or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 500, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

It is also recognized that the term "remote" may include data, objects, devices, components, and/or modules not stored locally, that is not accessible via the local bus. Thus, remote data may include data on a device which is physically stored in the same room and connected to the user's device via a network. In other situations, a remote device may also be located in a separate geographic area, such as, for example, in a different location, country, and so forth.

Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the target management system 100 and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the systems and methods with which that terminology is associated.

The various embodiments discussed above refer to initiating calls at the direction of a call originator 110, such as a sales agent. In some embodiments, the target management system 100 may be configured to initiate calls automatically on behalf of a company, or may be configured to make automated telephone calls. For example, the system may select caller ID information for placing calls to call targets with automated or computerized communications.

What is claimed is:

1. A target management computing system comprising:
one or more hardware computer processors; and
a non-transitory computer readable medium storing a caller identification selection algorithm executable by the one or more hardware computer processors to:
execute a prioritization algorithm on a plurality of user records to identify a particular user record having a current highest priority;
if a custom telephone number is set for the particular user record, select the custom telephone number as the outbound telephone number; and
if no custom telephone number is set for the particular user record:
if the particular user record was identified through a campaign, select a campaign telephone number as the outbound telephone number; and if the particular user record was not identified through a campaign:
  if an IP address associated with electronic device of the user that was used to communicate with an online entity is available:
    determine a geographic identifier associated with the IP address;
    based on the geographic identifier, select as the outbound telephone number a telephone number having a similar geographic identifier; and
  if an IP address or other geographic indicator is not available:
    if the particular user record is associated with a specific company having particular telephone numbers for outgoing calls, select a company telephone number associated with the specific company as the outbound telephone number; and
    if the particular user record is not associated with a company having particular telephone numbers for outgoing calls:
      if a call originator defined an outbound telephone number, select a call originator defined telephone number as the outbound telephone number; and
      if the call originator did not define an outbound telephone number, select a default outbound telephone number as the outbound telephone number; and
initiate an Application Programming Interface (API) call to a call management component, the API call including the outbound telephone number and an electronic destination address included in the particular user record;
wherein the call management component comprises a call initiation algorithm to:
  transmit an encoded call initiation data sequence to the electronic destination address, the encoded call initiation data sequence including the outbound telephone number encoded as caller identification information;
  monitor a connection with the electronic destination address; and
  when the user responds to the call initiation data sequence, associating the connection with an online multi-party connection interface.

2. The target management computing system of claim 1, wherein the call management component:
  transmits a second encoded call initiation data sequence to a second electronic destination address associated with a communication device of the online entity;
  monitors a second connection with the second electronic destination address; and
  when a second user responds to the second call initiation data sequence, associating the second connection with the online multi-party connection interface such that the first user and the second user communicate via the online multi-party connection interface.

3. The target management computing system of claim 2, wherein the call management component:
  in response to a first predefined input from the user or the second user, transmits a third encoded call initiation data sequence to a third electronic destination address associated with a second communication device of the online entity;
  monitors a third connection with the third electronic destination address; and
  when a third user responds to the third call initiation data sequence, associating the third connection with the online multi-party connection interface such that the user, second user, and the third user communicate via the online multi-party connection interface.

4. The target management computing system of claim 3, wherein the target management computing system further:
  determines an attribute of the user;
  accesses a database storing a plurality of attributes each associated with a corresponding caller identification information;
  determines a particular caller identification information associated with the determined attribute;
  wherein the third encoded call initiation data sequence includes the particular caller identification information.

5. An automated caller identification selection system comprising:
  one or more hardware computer processors; and
  a non-transitory computer readable medium storing instructions executable by the one or more hardware computer processors to:
  generate user interface data to cause presentation on a call originator computing system of a first user interface component;
  receive, from the call originator computing system, an indication of selection of the first user interface component by a user of the call originator system;
  access a call target database storing indications of:
    a plurality of potential call targets; and
    telephone numbers corresponding to respective potential call targets;
  select, from the call target database, a particular call target of the plurality of potential call targets;
  determine a telephone number associated with the particular call target in the call target database;
  determine caller identification information to include in an outbound telephone call initiated by automated call system to the particular call target, the caller identification information include one or more of a telephone number or alphanumeric characters, wherein selection of an outbound telephone number comprises:
  if a custom telephone number is set for the particular call target, select the custom telephone number as the outbound telephone number; and
  if no custom telephone number is set for the particular call target:
    if the particular call target was identified through a campaign, select a campaign telephone number as the outbound telephone number; and
    if the particular call target was not identified through a campaign:
      if a geographic location is available for the particular call target, select a local telephone number associated with the geographic location as the outbound telephone number by:
        if contact information for the particular call target includes a geographic marker:
          access a database of available telephone number for use in caller identification information of outbound telephone calls;
          determine whether there are one or more available telephone numbers for a geographic region corresponding to the geographic marker; and
          select the local telephone number from the one or more available telephone numbers for the geographic region corresponding to the geographic marker; and if the contact information for the particular call target does not include a geographic marker:
   query a demographic database, using available contact information for the particular call target, to access additional demographic data associated with the particular call target;
   if the additional demographic data includes a geographic marker for the particular call target:
      access the database of available telephone numbers for use in caller identification information of outbound telephone calls;
      determine whether there are one or more available telephone numbers for a geographic region corresponding to the geographic marker; and
      select the local telephone number from the one or more available telephone numbers for the geographic region corresponding to the geographic marker; and
if the geographic location is not available for the particular call target:
   if the particular call target is associated with a specific company having particular telephone numbers for outgoing calls, select a company telephone number associated with the specific company as the outbound telephone number; and
   if the particular call target is not associated with a company having particular telephone numbers for outgoing calls:
      if the call originator defined an outbound telephone number, select a call originator defined telephone number as the outbound telephone number; and
      if the call originator did not define an outbound telephone number, select a default outbound telephone number as the outbound telephone number; and
automatically initiate an outbound telephone call between the call originator and the particular call target with caller identification information in the outbound telephone call set to the selected outbound telephone number so that a calling device of the particular call target displays the selected outbound telephone number as caller identification information for the telephone call.

* * * * *